(12) United States Patent
Marple et al.

(10) Patent No.: US 8,007,940 B2
(45) Date of Patent: Aug. 30, 2011

(54) HIGH DISCHARGE CAPACITY LITHIUM BATTERY

(75) Inventors: Jack W. Marple, Avon, OH (US); Michael W. Wemple, Westlake, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 12/706,968

(22) Filed: Feb. 17, 2010

(65) Prior Publication Data

US 2010/0151303 A1    Jun. 17, 2010

Related U.S. Application Data

(60) Continuation-in-part of application No. 10/719,425, filed on Nov. 21, 2003, now abandoned, and a continuation of application No. 11/020,339, filed on Dec. 22, 2004, now abandoned, and a division of application No. 11/949,356, filed on Dec. 3, 2007, now abandoned.

(51) Int. Cl.
*H01M 6/10* (2006.01)
(52) U.S. Cl. ...... 429/221; 429/207; 429/209; 427/126.1
(58) Field of Classification Search .................. 429/221, 429/209, 207; 427/126.1
See application file for complete search history.

(56) References Cited

U.S. PATENT DOCUMENTS

| | | | |
|---|---|---|---|
| 4,071,665 A | 1/1978 | Garth | |
| 4,379,815 A | 4/1983 | Bubnick | |
| 4,629,666 A | 12/1986 | Schlaikjer | |
| 4,902,589 A | 2/1990 | Dahn | |
| 4,935,317 A | 6/1990 | Fauteux | |
| 5,051,183 A | 9/1991 | Takita et al. | |
| 5,143,805 A | 9/1992 | Anderman et al. | |
| 5,219,683 A | 6/1993 | Webber | |
| 5,229,227 A | 7/1993 | Webber et al. | |
| 5,240,655 A | 8/1993 | Troffkin et al. | |
| 5,281,491 A | 1/1994 | Rein et al. | |
| 5,290,414 A | 3/1994 | Marple | |
| 5,453,333 A | 9/1995 | Takauchi et al. | |

(Continued)

FOREIGN PATENT DOCUMENTS

EP    0068230 A1    1/1983

(Continued)

OTHER PUBLICATIONS

Yang Shao-Horn and Quinn C. Horn, "Chemical, structural, and electrochemical comparison of natural and synthetic FeS2 pyrite in lithium cells". Electrochimica Acta (2001) 2613-2621, Jan. 26, 2001.
L.A. Montoro and J.M. Rosolen, "Gelatin/DMSO: a new approach to enhancing the performance of a pyrite electrode in a lithium battery". Solid State Ionics 159 (2003) 233-240, Nov. 25, 2002.

(Continued)

*Primary Examiner* — Jane Rhee
(74) *Attorney, Agent, or Firm* — Robert C. Baraona

(57) ABSTRACT

A lithium/iron disulfide electrochemical battery cell with a high discharge capacity. The cell has a lithium negative electrode, an iron disulfide positive electrode and a nonaqueous electrolyte. The iron disulfide of the positive electrode has a controlled average particle size range which allows the electrochemical cells to exhibit desired properties in both low and high rate applications. In various embodiments, the iron disulfide particles are wet milled, preferably utilizing a media mill or milled utilizing a non-mechanical mill such as a jet mill, which reduces the iron disulfide particles to a desired average particle size range for incorporation into the positive electrode.

17 Claims, 6 Drawing Sheets

U.S. PATENT DOCUMENTS

| | | |
|---|---|---|
| 5,667,911 A | 9/1997 | Yu et al. |
| 5,691,077 A | 11/1997 | Yu |
| 5,786,396 A | 7/1998 | Takita et al. |
| 5,830,554 A | 11/1998 | Kaimai et al. |
| 5,853,633 A | 12/1998 | Kono et al. |
| 5,922,492 A | 7/1999 | Takita et al. |
| 5,952,120 A | 9/1999 | Yu et al. |
| 6,057,060 A | 5/2000 | Yu |
| 6,057,061 A | 5/2000 | Callahan et al. |
| 6,080,507 A | 6/2000 | Yu |
| 6,083,644 A | 7/2000 | Watanabe |
| 6,132,654 A | 10/2000 | Yu |
| 6,153,133 A | 11/2000 | Kaimai et al. |
| 6,180,280 B1 | 1/2001 | Spotnitz |
| 6,203,947 B1 | 3/2001 | Peled et al. |
| 6,218,054 B1 | 4/2001 | Webber |
| 6,245,272 B1 | 6/2001 | Takita et al. |
| 6,287,719 B1 | 9/2001 | Bailey |
| 6,287,730 B1 | 9/2001 | Callahan et al. |
| 6,319,865 B1 | 11/2001 | Mikami |
| 6,322,923 B1 | 11/2001 | Spotnitz et al. |
| 6,346,350 B1 | 2/2002 | Call et al. |
| 6,368,742 B2 | 4/2002 | Fisher et al. |
| 6,432,586 B1 | 8/2002 | Zhang |
| 6,475,679 B1 | 11/2002 | Tsutiya et al. |
| 6,479,190 B1 | 11/2002 | Wensley |
| 6,566,012 B1 | 5/2003 | Takita et al. |
| 6,602,593 B1 | 8/2003 | Callahan et al. |
| 6,616,715 B2 | 9/2003 | Kitoh et al. |
| 6,630,257 B2 | 10/2003 | Ye et al. |
| 7,312,002 B2 | 12/2007 | Aoshima |
| 7,491,378 B2 | 2/2009 | Yamamoto |
| 7,687,189 B2 | 3/2010 | Wu |
| 2002/0018929 A1* | 2/2002 | Dai et al. ............ 429/137 |
| 2002/0039677 A1 | 4/2002 | Iwamoto et al. |
| 2002/0064706 A1 | 5/2002 | Zhang et al. |
| 2002/0122985 A1 | 9/2002 | Sato et al. |
| 2002/0134964 A1 | 9/2002 | Christian et al. |
| 2003/0072995 A1 | 4/2003 | Nark et al. |
| 2004/0121234 A1 | 6/2004 | Le |
| 2005/0106458 A1 | 5/2005 | Eguchi et al. |
| 2005/0277023 A1* | 12/2005 | Marple et al. ............ 429/221 |
| 2006/0035147 A1 | 2/2006 | Lam et al. |
| 2008/0118836 A1 | 5/2008 | Hwang |

FOREIGN PATENT DOCUMENTS

| | | |
|---|---|---|
| EP | 1097962 A | 5/2001 |
| EP | 1296389 A | 3/2003 |
| EP | 1829140 B1 | 5/2007 |
| JP | 59012566 | 1/1984 |
| JP | 59226468 | 12/1984 |
| JP | 61151968 | 7/1986 |
| WO | 2005053067 A2 | 6/2005 |

OTHER PUBLICATIONS

E. Strauss, D. Golodnitsky, K. Freedman, A. Milner, E. Peled, "To the electrochemistry of pyrite in Li/solid composite-polymer-electrolyte battery". Journal of Power Sources 115 (2003) 323-331, Dec. 16, 2002.

Gowri S. Nagarajan, J.W. Van Zee and R.M. Spotnitz, "A Mathematical Model for Intercalation Electrode Behavior, I. Effect of Particle-Size Distribution on Discharge Capacity". J. Electrochem. Soc., vol. 145, No. 3, Mar. 1998.

Eveready Battery Company, Inc. response to Preliminary Opinion of the Opposition Division, Aug. 24, 2010, 4 pages.

Gillette response to Preliminary Opinion of the Opposition Division, Aug. 25, 2010, 5 pages.

Eveready Battery Company, Inc. response to opponent late submission, Sep. 20, 2010, 5 pages.

Patent Cooperation Treaty (PCT), International Search Report and Written Opinion for Application No. PCT/US2005/011367, filed Apr. 1, 2005, mailed Jan. 5, 2006, 11 pgs., European Patent Office, Netherlands.

Shao-Horn, et al. "Reinvestigation of Lithium Reaction Mechanisms in $FeS_2$ Pyrite at Ambient Temperature". Journal of the Electrochemical Society, 149 (12) A1547-A1555 (2002).

Li et al. "Rate Capabilities of Nanostructured $LiMn_2O_4$ Electrodes in Aqueous Electrolyte," Journal of the Electrochemical Society, 147 (6) 2044-2049 (2000).

Kim et al., "Synthesis and Lithium Intercalation Properties of Nanocrystalline Lithium Iron Oxides," Journal of the Electrochemical Society, 146 (12) 4371-4374 (1999).

"Advantages of the Zinger Horizontal Media Mill," Morehouse-COWLES, www.morehousecowles.com.

"Hi Energy Lithium," Application Manual. Energizer Power Systems, pp. 1-20.

Statement of Grounds of Appeal of The Gillette Company, Mar. 15, 2011, 13 pages.

Declaration of Nikolai Issaev, Nov. 5, 2009. Declaration of Adrian John Fisher, May 15, 2009. Carpmaels & Ransford, London.

Opposition by The Gillette Company. Dec. 22, 2009.

Opposition by The Gillette Company. Mar. 9, 2009.

"Improvements in Energizer's L91 $Li$-$FeS_2$ AA Cells", Andrew Webber. Proceedings of the 41st Power Sources Conference, Jun. 14-17, 2004.

Advanced Program, 41st Power Sources Conference, Jun. 14-17, 2001.

"Preparation of Iron Disulfide and its Use for Lithium Batteries", Chiaki Iwakura, Noriyuki Isobe and Hideo Tamura.

"Nano-$FeS_2$ for Commercial $LiFeS_2$ Primary Batteries", Journal of the Electrochemical Society, Yang Shao-Horn, Steve Osmialowski, and Quinn C. Horn, Oct. 9, 2002.

* cited by examiner

HIGH DISCHARGE CAPACITY LITHIUM BATTERY

CROSS REFERENCE

Pursuant to 35 USC §§120 and/or 121, this application is a continuation-in-part of now-abandoned U.S. application Ser. No. 10/719,425, filed Nov. 21, 2003 and entitled "HIGH DISCHARGE CAPACITY LITHIUM BATTERY". This application claims priority to now-abandoned U.S. application Ser. No. 11/020,339 filed on Dec. 22, 2004 and copending U.S. application Ser. No. 11/949,356 filed on Dec. 3, 2007, both of which are entitled "HIGH DISCHARGE CAPACITY LITHIUM BATTERY". All of the applications identified in this paragraph are fully incorporated by reference.

FIELD OF THE INVENTION

This invention relates to electrochemical battery cells, particularly cells with a lithium negative electrode and an iron disulfide positive electrode. In one embodiment, the positive electrode includes iron disulfide particles having a specific small average particle size range which enables the electrochemical cell to exhibit desirable properties for both low and high rate applications. The iron disulfide particles are formed via a wet or dry process which reduces the particle size thereof to a predetermined size range. In a preferred method of the invention, a cathode slurry comprising the iron disulfide particles is milled utilizing a media mill which reduces the iron disulfide particles to a desired average particle size range for incorporation into the positive electrode. In a further preferred embodiment, iron disulfide particles are processed utilizing jet milling before being incorporated into the positive electrode.

BACKGROUND OF THE INVENTION

Lithium batteries (batteries containing metallic lithium as the negative electrode active material) are becoming increasingly popular as portable power sources for electronic devices that have high power operating requirements. Common consumer lithium batteries include lithium/manganese dioxide ($Li/MnO_2$) and lithium/iron disulfide ($Li/FeS_2$) batteries, which have nominal voltages of 3.0 and 1.5 volts per cell, respectively.

Battery manufacturers are continually striving to design batteries with more discharge capacity. This can be accomplished by minimizing the volume in the cell taken up by the housing, including the seal and the vent, thereby maximizing the internal volume available for active materials. However, there will always be practical limitations on the maximum internal volume.

Another approach is to modify the internal cell design and materials to increase the discharge capacity. How to best accomplish this can depend at least in part on the discharge requirements of the devices to be powered by the batteries. For devices with low power requirements, the quantity of active materials tends to be very important, while for devices with high power requirements, discharge efficiencies tend to be more important. Lithium batteries are often used in high power devices, since they are capable of excellent discharge efficiencies on high power discharge.

In general, battery discharge efficiency decreases rapidly with increasing discharge power. Therefore, for high power providing high discharge efficiency is a priority. This often means using designs containing less active materials, thus sacrificing capacity on low power and low rate discharge. For example, for good high power discharge efficiency, high interfacial surface area between the negative electrode (anode) and positive electrode (cathode) relative to the volume of the electrodes is desirable. This is often accomplished by using a spirally wound electrode assembly, in which relatively long, thin electrode strips are wound together in a coil. Unless the electrode compositions have a high electrical conductivity, such long, thin electrodes typically require a current collector extending along much of the length and width of the electrode strip. The high interfacial surface area of the electrodes also means that more separator material is needed to electrically insulate the positive and negative electrodes from each other. Because the maximum external dimensions are often set for the cells, either by industry standards or the size and shape of the battery compartments in equipment, increasing the electrode interfacial surface area also means having to reduce the amount of active electrode materials that can be used.

For batteries that are intended for both high and low power use, reducing cell active material inputs in order to maximize high power performance is less desirable than for batteries intended for only high power use. For example, AA size 1.5 volt $Li/FeS_2$ (FR6 size) batteries are intended for use in high power applications such as photoflash and digital still camera as well as general replacements for AA size 1.5 volt alkaline $Zn/MnO_2$ batteries, which are often used in lower power devices. In such situations it is important to maximize both high power discharge efficiency and cell input capacity. While it is generally desirable to maximize the electrode input capacity in any cell, the relative importance of doing so is greater in cells for lower power usage.

To maximize the active material inputs in the cell and mitigate the effects thereon of increasing the electrode interfacial surface area, it is desirable to use separator materials that take up as little internal volume in the cell as possible. There are practical limitations to doing so. The separator must be able to withstand the cell manufacturing processes without damage, provide adequate electrical insulation and ion transport between the anode and cathode and do so without developing defects resulting in internal short circuits between the anode and cathode when the cell is subjected to both normal and anticipated abnormal conditions of handling, transportation, storage and use.

Separator properties can be modified in a number of ways to improve the strength and resistance to damage. Examples are disclosed in U.S. Pat. Nos. 5,952,120; 6,368,742; 5,667,911 and 6,602,593. However, changes made to increase strength can also adversely affect separator performance, based in part on factors such as cell chemistry, electrode design and features, cell manufacturing process, intended cell use, anticipated storage and use conditions, etc.

For certain cell chemistries maximizing the amounts of active materials in the cell can be more difficult. In lithium batteries, when the active cathode material reacts with the lithium to produce reaction products having a total volume greater than that of the reactants, swelling of the electrode assembly creates additional forces in the cell. These forces can cause bulging of the cell housing and short circuits through the separator. Possible solutions to these problems include using strong (often thicker) materials for the cell housing and inert components within the cell, further limiting the internal volume available for active materials in cells with such active materials compared to cells with lower volume reaction products. For $Li/FeS_2$ cells another possible solution, disclosed in U.S. Pat. No. 4,379,815, is to balance cathode expansion and anode contraction by mixing another active material with the FeS$_2$. Such active cathode materials include CuO, Bi$_2$O$_3$, Pb$_2$Bi$_2$O$_5$, P$_3$O$_4$, CoS$_2$ and mixtures thereof. However, adding other active materials to the cathode mixture can affect the electrical and discharge characteristics of the cell.

Just as battery manufacturers are continually trying to improve discharge capacity, they are also continually working to improve other battery characteristics, such as safety and reliability; making cells more resistant to internal short circuits can contribute to both. As is clear from the above discussion, changes made to improve resistance to internal short circuits can be counterproductive in maximizing discharge capacity.

The pyrite or iron disulfide (FeS$_2$) particles utilized in electrochemical cell cathodes are typically derived from natural ore which is crushed, heat treated, and dry milled to a particle size of 20 to 30 microns. The fineness of the grind is limited by the reactivity of the particles with air and moisture. As the particle size is reduced, the surface area thereof is increased and is weathered. Weathering is an oxidation process in which the iron disulfide reacts with moisture and air to form iron sulfates. The weathering process results in an increase in acidity and a reduction in electrochemical activity. Small pyrite particles can generate sufficient heat during oxidation to cause hazardous fires within the processing operation. Prior art iron disulfide particles utilized can have particles sizes which approach the final cathode coating thickness of about 80 microns due to the inconsistencies of the dry milling process.

The dry milling process of iron disulfide is typically performed by a mining company or an intermediate wherein large quantities of material are produced. The processed iron disulfide is shipped and generally stored for extended periods of time before it can be used by the battery industry. Thus, during the storage period, the above-noted oxidation and weathering occur and the material degrades. Moreover, the large iron disulfide particles sizes can impact processes such as calendering, causing substrate distortion, coating to substrate bond disruption, as well as failures from separator damage.

SUMMARY OF THE INVENTION

In view of the above, an object of the present invention is to provide a lithium battery cell with increased discharge capacity. Another object of the invention is to provide a lithium battery cell with a high energy density (interfacial discharge capacity to interfacial electrode volume). Another object of the invention is to provide a Li/FeS$_2$ cell with a high interfacial electrode surface area that has increased discharge capacity on low power discharge without sacrificing discharge efficiency on high power discharge, preferably one with increased discharge capacity on both high rate and low rate discharge. Yet another object of the invention is to provide a Li/FeS$_2$ cell with increased cathode interfacial capacity and having both improved energy density and good resistance to internal short circuits.

It is an additional object of the present invention to provide an electrochemical cell having a positive electrode comprising relatively small average particle size FeS$_2$ particles. A further object is to provide an electrochemical cell having increased low and high rate product performance. Yet another object is to provide an electrochemical cell which maintains a high voltage output for an extended period of time. Still a further object of the invention is to provide methods for producing electrochemical cells and especially a positive electrode therefore with the method including the steps of forming a slurry comprising FeS$_2$ particles and a wetting agent; utilizing a mill, particularly a media mill, to reduce the average particle size of the FeS$_2$ particles, and subsequently forming the positive electrode utilizing the slurry. Another object of the present invention is to provide electrochemical cells having a positive electrode comprising iron disulfide particles which have been milled to a desired average particle size range utilizing a process such as jet milling, in which substantially no heat is generated and narrow a particle size distribution is obtained.

The above objects are met and the above disadvantages of the prior art are overcome by the present invention.

Accordingly, one aspect of the present invention is directed to an electrochemical battery cell comprising a housing; a negative electrode strip comprising metallic lithium, a positive electrode strip comprising an active material mixture and an electrolyte comprising at least one salt dissolved in a nonaqueous electrolyte disposed within the housing; and a separator disposed between the negative and positive electrodes; the cell having a ratio of a cathode interfacial capacity to an electrode assembly interfacial volume of at least 710 mAh/cm$^3$.

Another aspect of the present invention is directed to an electrochemical battery cell comprising a housing; a negative electrode, a positive electrode, and an electrolyte disposed within the housing; and a separator disposed between the negative and positive electrodes. The housing comprises a cylindrical container with an integral closed bottom end, an initially open top end, a side wall extending between the bottom and top ends and a cover disposed in the top end to close the cell; the negative electrode is in the form of a strip with two opposing major surfaces and comprises metallic lithium; the positive electrode is in the form of a strip with two opposing major surfaces and comprises an active material mixture, the active material comprising greater than 50 weight percent iron disulfide; the electrolyte comprises one or more salts dissolved in a nonaqueous organic solvent; the negative and positive electrodes and the separator form a spiral wound cylindrical electrode assembly, with a radial outer surface disposed adjacent an inner surface of the container side wall; the electrode assembly has an interfacial volume; the positive electrode has an interfacial capacity; a ratio of the positive electrode interfacial capacity to the electrode assembly interfacial volume is at least 710 mAh/cm$^3$; and the separator is a microporous membrane comprising polyethylene, with a machine direction and a transverse direction, an average thickness less than 22 μm and a tensile stress of at least 1.0 kgf/cm in both the machine direction and the transverse direction.

Another aspect of the present invention is directed to an electrochemical battery cell comprising a housing; a negative electrode, a positive electrode and an electrolyte disposed within the housing; and a separator disposed between the negative and positive electrodes. The cell is a cylindrical FR6 type Li/FeS$_2$ cell with a spiral wound electrode assembly having an electrode assembly interfacial volume; the cell has an interfacial capacity of at least 3500 mAh; the separator is a microporous membrane comprising polyethylene and has an average thickness less than 22 μm, a tensile stress of at least 2.0 kgf/cm in both a machine direction and a transverse direction, a dielectric breakdown voltage of at least 2400 volts, a maximum effective pore size of 0.08 μm to 0.20 μm and a BET specific surface area of 4.0 to 15 m$^2$/g.

Yet another aspect of the present invention is directed to an electrochemical battery cell comprising a housing; a negative electrode, a positive electrode and an electrolyte disposed within the housing; and a separator disposed between the negative and positive electrodes. The cell is a cylindrical FR6 type Li/FeS$_2$ cell with a spiral wound electrode assembly having an electrode assembly interfacial volume; the separator is a microporous membrane comprising polyethylene and has an average thickness less than 22 µm, a tensile stress of at least 2.0 in both a machine direction and a transverse direction, a dielectric breakdown voltage of at least 2400 volts and a maximum effective pore size of 0.08 µm to 0.20 µm; the positive electrode comprises an active material comprising at least 95 weight percent iron disulfide; and the cell is capable of providing a discharge capacity of at least 2950 mAh when discharged at 200 mA continuously to 1.0 volt and a discharge capacity of at least 2600 mAh when discharged at 1000 mA continuously to 1.0 volt.

A further aspect of the invention is directed to an electrochemical battery cell comprising a housing; a negative electrode comprising lithium; a positive electrode comprising an active material, said active material comprising greater than 49 weight percent iron disulfide, said iron disulfide having an average particle size of about 1 to about 19 µm electrolyte mixture comprising at least one salt dissolved in a non-aqueous electrolyte disposed within the housing; and a separator disposed between the negative electrode and the positive electrode.

Yet another aspect of the invention is directed to an electrochemical battery cell comprising a housing; a negative electrode comprising lithium; a positive electrode comprising an active material, said active material comprising greater than 49 weight percent of iron disulfide; an electrolyte mixture comprising at least one salt dissolved in a non-aqueous electrolyte disposed within the housing; and a separator disposed between the negative electrode and the positive electrode, wherein (a) the electrolyte has a conductivity greater than 2.5 mS/cm and the separator has a thickness of 1 to 25 µm; or (b) the electrolyte has a conductivity greater than 2.5 mS/cm and the iron disulfide has an average particle size of 1 to 19 µm; or (c) the separator has a thickness of 1 to 25 µm and the iron disulfide has an average particle size of 1 to 19 µm.

Still another aspect of the invention is directed to a process for preparing a cathode, comprising the steps of forming a slurry comprising a wetting agent and iron disulfide particles having an average particle size greater than 20 milling the slurry utilizing a media mill comprising grinding media to reduce the particle size of the iron disulfide particles to 1 to 19 µm average particle size, applying the milled cathode slurry to a cathode substrate for form a cathode, and drying the cathode.

Still another aspect of the invention is directed to an electrochemical battery cell comprising a housing; a negative electrode comprising lithium; a positive electrode comprising an active material, said active material comprising greater than 49 weight percent of iron disulfide; an electrolyte mixture comprising at least one salt dissolved in a non-aqueous electrolyte disposed within the housing; and a separator disposed between the negative electrode and the positive electrode, wherein the cell is an FR6 type cell having a discharge time of at least 320 minutes to 1.05 volts according to a 1500/650 mW ⅔s s×10 per hour DSC test at room temperature.

These and other features, advantages and objects of the present invention will be further understood and appreciated by those skilled in the art by reference to the following specification, claims and appended drawings.

Unless otherwise specified, as used herein the terms listed below are defined as follows:

active material—one or more chemical compounds that are part of the discharge reaction of a cell and contribute to the cell discharge capacity, including impurities and small amounts of other moieties present;

active material mixture—a mixture of solid electrode materials, excluding current collectors and electrode leads, that contains the electrode active material;

average particle size—the mean diameter of the volume distribution of a sample of a composition (MV); can be measured using a Microtrac Honeywell Particle Size Analyzer Model X-100 equipped with a Large Volume Recirculator (LVR) (4 L Volume) Model 9320. The measuring method utilizes sonification to break up agglomerates and prevent re-agglomeration. A sample of about 2.0 grams is weighed and placed into a 50 ml beaker. 20 ml of deionized water and 2 drops of surfactant (1% Aerosol OT solution prepared from 10 ml 10% Aerosol OT available from Fisher Scientific in 100 mls deionized water with the solution being well mixed). The beaker sample solution is stirred, preferably with a stirring rod. The Large Volume Recirculator is filled to level with deionized water and the sample is transferred from the beaker to the Recirculator bowl. A wash bottle is used to rinse out any remaining sample particles into the Recirculator bowl. The sample is allowed to recirculate for one minute before measurements are started. The following parameters are input for FeS$_2$ particles: Transparent Particles—No (absorbing); Spherical Particles—No; Fluid Refractive Index—1.33; Run Time—60 seconds;

capacity, discharge—the actual capacity delivered by a cell during discharge, generally expressed in amp-hour (Ah) or milliamp-hours (mAh);

capacity, input—the theoretical capacity of an electrode, equal to the weight of each active material in the electrode times the theoretical specific capacity of that active material, where the theoretical specific capacity of each active material is determined according to the following calculation:

[(96,487 ampere-seconds/mole)/(number of grams/mole of active material)]×(number of electrons/mole of active material)/(3600 seconds/hour)×(1000 milliampere hours/ampere-hour)

(e.g., Li=3862.0 mAh/g, S=1672.0 mAh/g, FeS$_2$=893.6 mAh/g, CoS$_2$—871.3 mAh/g, CF$_x$=864.3 mAh/g, CuO=673.8 mAh/g, C$_2$F=623.0 mAh/g, FeS=609.8 mAh/g, CuS=560.7 mAh/g, Bi$_2$O$_3$=345.1 mAh/g, MnO$_2$=308.3 mAh/g, Pb$_2$Bi$_2$O$_5$=293.8 mAh/g and FeCuS$_2$—292.1 mAh/g);

capacity, cell interfacial—the smaller of the negative and positive electrode capacity;

capacity, electrode interfacial—the total contribution of an electrode to the cell theoretical discharge capacity, based on the overall cell discharge reaction mechanism(s) and the total amount of active material contained within the that portion of the active material mixture adjacent to active material in the opposite electrode, assuming complete reaction of all of the active material, generally expressed in Ah or mAh (where only one of the two major surfaces of an electrode strip is adjacent active material in the opposite electrode, only the active material on that side of the electrode—either the material on that side of a solid current collector sheet or that material in half the thickness of an electrode without a solid current collector sheet—is included in the determination of interfacial capacity);

electrode assembly—the combination of the negative electrode, positive electrode, and separator, as well as any insulating materials, overwraps, tapes, etc., that are incorporated therewith, but excluding any separate electrical lead affixed to the active material, active material mixture or current collector;

electrode gap—the distance between adjacent negative and positive electrodes;

electrode loading—active material mixture dry weight per unit of electrode surface area, generally expressed in grams per square centimeter (g/cm$^2$);

electrode packing—active material dry weight per unit of electrode surface area divided by the theoretical active material mixture dry weight per unit of electrode surface area, based on the real densities of the solid materials in the mixture, generally expressed as a percentage;

folded electrodes—electrode strips that are combined into an assembly by folding, with the lengths of the strips either parallel to or crossing one another;

interfacial height, electrode assembly—the average height, parallel to the longitudinal axis of the cell, of the interfacial surface of the electrodes in the assembly;

interfacial volume, electrode assembly—the volume within the cell housing defined by the cross-sectional area, perpendicular to the longitudinal axis of the cell, at the inner surface of the container side wall(s) and the electrode assembly interfacial height;

nominal—a value, specified by the manufacturer, that is representative of what can be expected for that characteristic or property;

percent discharge—the percentage of the rated capacity removed from a cell during discharge;

room temperature—between about 20° C. and about 25° C.;

spiral wound electrodes—electrode strips that are combined into an assembly by winding along their lengths or widths, e.g., around a mandrel or central core; and void volume, electrode assembly—the volume of the electrode assembly voids per unit of interfacial height, determined by subtracting the sum of the volumes of the non-porous electrode assembly components and the solid portions of the porous electrode assembly components contained within the interfacial height from the electrode assembly interfacial volume (microporous separators, insulating films, tapes, etc. are assumed to be non-porous and non-compressible, and volume of a porous electrode is determined using the real densities of the components and the total actual volume), generally expressed in cm$^3$/cm.

BRIEF DESCRIPTION OF THE DRAWINGS

The invention will be better understood and other features and advantages will become apparent by reading the detailed description of the invention, taken together with the drawings, wherein.

DESCRIPTION OF THE INVENTION

The battery cell of the invention has an anode comprising metallic lithium as the negative electrode active material. The anode and cathode are both in the form of strips, which are joined together in an electrode assembly to provide a high interfacial surface area relative to the volumes of the electrodes containing active material. The higher the interfacial surface area, the lower the current density and the better the cell's capability to deliver high power on discharge. The cell also has a high ratio of cathode interfacial capacity to electrode assembly interfacial volume—at least 710 mAh/cm$^2$. This means that the volume of active materials in the electrode assembly is high, to provide a high discharge capacity. The high volume of active materials can be achieved by controlling a number of variables, including: the ratio of interfacial input capacity to total input capacity, the volume of the cathode current collector, the concentration of active cathode material in the cathode mixture and the volume of separator in the electrode assembly.

Figure 1:
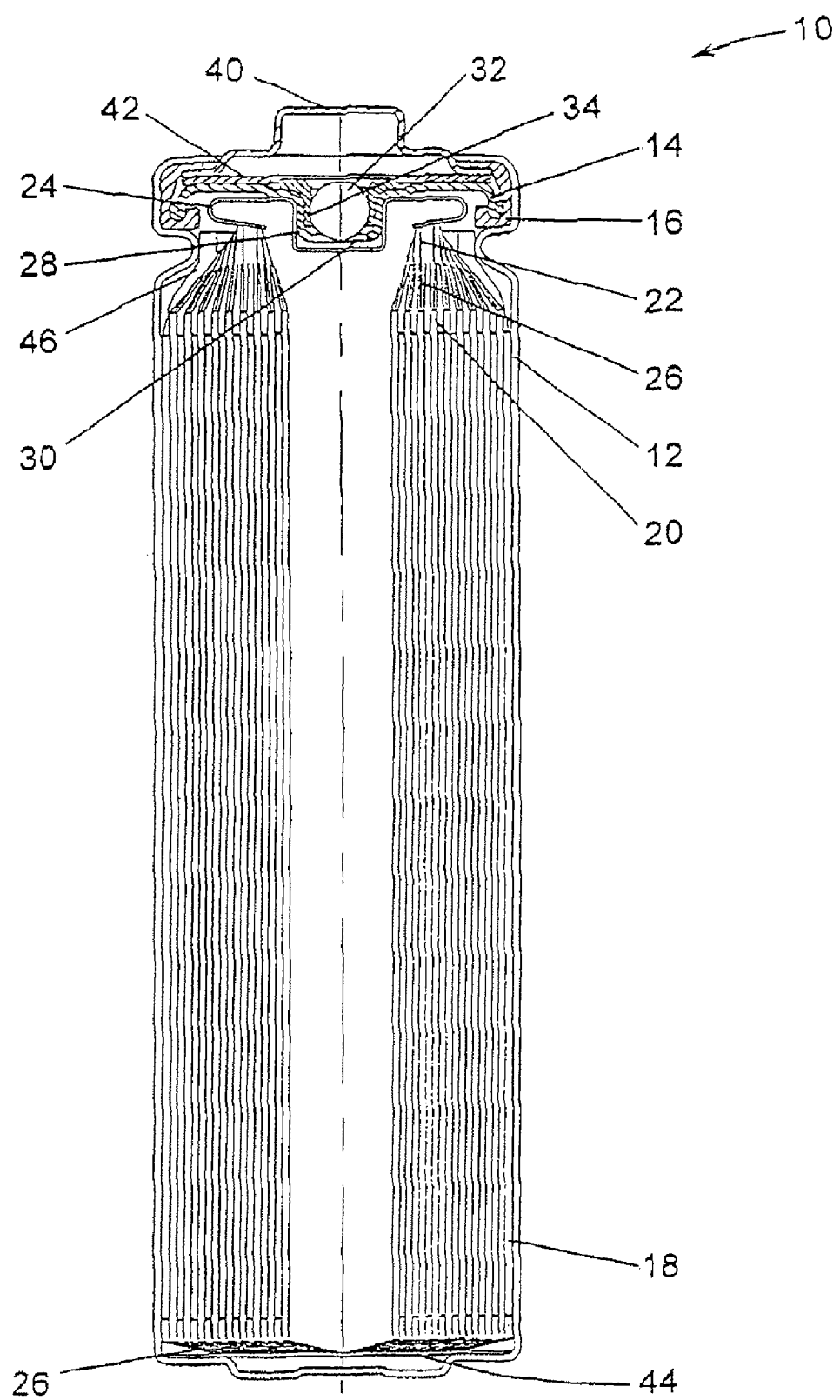
FIG. 1 is an embodiment of the electrochemical battery cell of the invention.

The invention will be better understood with reference to FIG. 1, which shows an embodiment of a cell according to the invention. Cell 10 is an FR6 type cylindrical Li/FeS$_2$ battery cell. Cell 10 has a housing that includes a can 12 with a closed bottom and an open top end that is closed with a cell cover 14 and a gasket 16. The can 12 has a bead or reduced diameter step near the top end to support the gasket 16 and cover 14. The gasket 16 is compressed between the can 12 and the cover 14 to seal an anode 18, a cathode 20 and electrolyte within the cell 10. The anode 18, cathode 20 and a separator 26 are spirally wound together into an electrode assembly. The cathode 20 has a metal current collector 22, which extends from the top end of the electrode assembly and is connected to the inner surface of the cover 14 with a contact spring 24. The anode 18 is electrically connected to the inner surface of the can 12 by a metal tab (not shown). An insulating cone 46 is located around the peripheral portion of the top of the electrode assembly to prevent the cathode current collector 22 from making contact with the can 12, and contact between the bottom edge of the cathode 20 and the bottom of the can 12 is prevented by the inward-folded extension of the separator 26 and an electrically insulating bottom disc 44 positioned in the bottom of the can 12. Cell 10 has a separate positive terminal cover 40, which is held in place by the inwardly crimped top edge of the can 12 and the gasket 16. The can 12 serves as the negative contact terminal. Disposed between the peripheral flange of the terminal cover 40 and the cell cover 14 is a positive temperature coefficient (PTC) device 42 that substantially limits the flow of current under abusive electrical conditions. Cell 10 also includes a pressure relief vent. The cell cover 14 has an aperture comprising an inward projecting central vent well 28 with a vent hole 30 in the bottom of the well 28. The aperture is sealed by a vent ball 32 and a thin-walled thermoplastic bushing 34, which is compressed between the vertical wall of the vent well 28 and the periphery of the vent ball 32. When the cell internal pressure exceeds a predetermined level, the vent ball 32, or both the ball 32 and bushing 34, is forced out of the aperture to release pressurized gases from the cell 10.

The cell container is often a metal can with an integral closed bottom; though a metal tube that is initially open at both ends may also be used instead of a can. The can is generally steel, plated with nickel on at least the outside to protect the outside of the can from corrosion. The type of plating can be varied to provide varying degrees of corrosion resistance or to provide the desired appearance. The type of steel will depend in part on the manner in which the container is formed. For drawn cans the steel can be a diffusion annealed, low carbon, aluminum killed, SAE 1006 or equivalent steel, with a grain size of ASTM 9 to 11 and equiaxed to slightly elongated grain shape. Other steels, such as stainless steels, can be used to meet special needs. For example, when the can is in electrical contact with the cathode, a stainless steel may be used for improved resistance to corrosion by the cathode and electrolyte.

The cell cover is typically metal. Nickel plated steel may be used, but a stainless steel is often desirable, especially when the cover is in electrical contact with the cathode. The complexity of the cover shape will also be a factor in material selection. The cell cover may have a simple shape, such as a thick, flat disk, or it may have a more complex shape, such as the cover shown in FIG. 1. When the cover has a complex shape like that in FIG. 1, a type 304 soft annealed stainless steel with ASTM 8-9 grain size may be used, to provide the desired corrosion resistance and ease of metal forming. Formed covers may also be plated, with nickel for example.

The terminal cover should have good resistance to corrosion by water in the ambient environment, good electrical conductivity and, when visible on consumer batteries, an attractive appearance. Terminal covers are often made from nickel plated cold rolled steel or steel that is nickel plated after the covers are formed. Where terminals are located over pressure relief vents, the terminal covers generally have one or more holes to facilitate cell venting.

The gasket is made from any suitable thermoplastic material that provides the desired sealing properties. Material selection is based in part on the electrolyte composition. Examples of suitable materials include polypropylene, polyphenylene sulfide, tetrafluoride-perfluoroalkyl vinylether copolymer, polybutylene terephthalate and combinations thereof. Preferred gasket materials include polypropylene (e.g., PRO-FAX® 6524 from Basell Polyolefins, Wilmington, Del., USA), polybutylene terephthalate (e.g., CELANEX® PBT, grade 1600A from Ticona-US, Summit, N.J., USA) and polyphenylene sulfide (e.g., TECHTRON® PPS from Boedeker Plastics, Inc., Shiner, Tex., USA). Small amounts of other polymers, reinforcing inorganic fillers and/or organic compounds may also be added to the base resin of the gasket.

The gasket may be coated with a sealant to provide the best seal. Ethylene propylene diene terpolymer (EPDM) is a suitable sealant material, but other suitable materials can be used.

The vent bushing is made from a thermoplastic material that is resistant to cold flow at high temperatures (e.g., 75° C.). The thermoplastic material comprises a base resin such as ethylene-tetrafluoroethylene, polybutylene terephthlate, polyphenylene sulfide, polyphthalamide, ethylenechloro-trifluoroethylene, chlorotrifluoroethylene, perfluoroalkoxyalkane, fluorinated perfluoroethylene polypropylene and polyetherether ketone. Ethylene-tetrafluoroethylene copolymer (ETFE), polyphenylene sulfide (PPS), polybutylene terephthalate (PBT) and polyphthalamide are preferred. The resin can be modified by adding a thermal-stabilizing filler to provide a vent bushing with the desired sealing and venting characteristics at high temperatures. The bushing can be injection molded from the thermoplastic material. TEFZEL® HT2004 (ETFE resin with 25 weight percent chopped glass filler) is a preferred thermoplastic material.

The vent ball can be made from any suitable material that is stable in contact with the cell contents and provides the desired cell sealing and venting characteristic. Glasses or metals, such as stainless steel, can be used.

The anode comprises a strip of lithium metal, sometimes referred to as lithium foil. The composition of the lithium can vary, though for battery grade lithium the purity is always high. The lithium can be alloyed with other metals, such as aluminum, to provide the desired cell electrical performance. Battery grade lithium-aluminum foil containing 0.5 weight percent aluminum is available from Chemetall Foote Corp., Kings Mountain, N.C., USA.

The anode may have a current collector, within or on the surface of the metallic lithium. As in the cell in FIG. 1, a separate current collector may not be needed, since lithium has a high electrical conductivity, but a current collector may be included, e.g., to maintain electrical continuity within the anode during discharge, as the lithium is consumed. When the anode includes a current collector, it may be made of copper because of its conductivity, but other conductive metals can be used as long as they are stable inside the cell.

A thin metal strip often serves as an electrical lead, or tab, connecting the anode to one of the cell terminals (the can in the case of the FR6 cell shown in FIG. 1). The metal strip is often made from nickel or nickel plated steel and affixed directly to the lithium. This may be accomplished embedding an end of the lead within a portion of the anode or by simply pressing an end of the lead onto the surface of the lithium foil.

The cathode is in the form of a strip that comprises a current collector and a mixture that includes one or more electrochemically active materials, usually in particulate form. Iron disulfide ($FeS_2$) is a preferred active material. In a $Li/FeS_2$ cell the active material comprises greater than 50 weight percent $FeS_2$. The cathode can also contain one or more additional active materials, depending on the desired cell electrical and discharge characteristics. The additional active cathode material may be any suitable active cathode material. Examples include $Bi_2O_3$, $C_2F$, $CF_x$, $(CF)_n$, $CoS_2$, $CuO$, $CuS$, $FeS$, $FeCuS_2$, $MnO_2$, $Pb_2Bi_2O_5$ and S. More preferably the active material for a $Li/FeS_2$ cell cathode comprises at least 95 weight percent $FeS_2$, yet more preferably at least 99 weight percent $FeS_2$, and most preferably $FeS_2$ is the sole active cathode material. Battery grade $FeS_2$ having a purity level of at least 95 weight percent is available from American Minerals, Inc., Camden, N.J., USA; Chemetall GmbH, Vienna, Austria; Washington Mills, North Grafton, Mass.; and Kyanite Mining Corp., Dillwyn, Va., USA.

In addition to the active material, the cathode mixture contains other materials. A binder is generally used to hold the particulate materials together and adhere the mixture to the current collector. One or more conductive materials such as metal, graphite and carbon black powders may be added to provide improved electrical conductivity to the mixture. The amount of conductive material used can be dependent upon factors such as the electrical conductivity of the active material and binder, the thickness of the mixture on the current collector and the current collector design. Small amounts of various additives may also be used to enhance cathode manufacturing and cell performance. The following are examples of active material mixture materials for $Li/FeS_2$ cell cathodes.

Graphite: KS-6 and TIMREX® MX15 grades synthetic graphite from Timcal America, Westlake, Ohio, USA. Carbon black: Grade C55 acetylene black from Chevron Phillips Company LP, Houston, Tex., USA. Binder: ethylene/propylene copolymer (PEPP) made by Polymont Plastics Corp. (formerly Polysar, Inc.) and available from Harwick Standard Distribution Corp., Akron, Ohio, USA; non-ionic water soluble polyethylene oxide (PEO): POLYOX® from Dow Chemical Company, Midland, Mich., USA; and G1651 grade styrene-ethylene/butylenes-styrene (SEBS) block copolymer from Kraton Polymers, Houston, Tex. Additives: FLUO HT® micronized polytetrafluoroethylene (PTFE) manufactured by Micro Powders Inc., Tarrytown, N.Y., USA (commercially available from Dar-Tech Inc., Cleveland, Ohio, USA) and AEROSIL® 200 grade fumed silica from Degussa Corporation Pigment Group, Ridgefield, N.J.

The current collector may be disposed within or imbedded into the cathode surface, or the cathode mixture may be coated onto one or both sides of a thin metal strip. Aluminum is a commonly used material. The current collector may extend beyond the portion of the cathode containing the cathode mixture. This extending portion of the current collector can provide a convenient area for making contact with the electrical lead connected to the positive terminal. It is desirable to keep the volume of the extending portion of the current collector to a minimum to make as much of the internal volume of the cell available for active materials and electrolyte.

A preferred method of making $FeS_2$ cathodes is to roll coat a slurry of active material mixture materials in a highly volatile organic solvent (e.g., trichloroethylene) onto both sides of a sheet of aluminum foil, dry the coating to remove the solvent, calender the coated foil to compact the coating, slit the coated foil to the desired width and cut strips of the slit cathode material to the desired length. It is desirable to use cathode materials with small particle sizes to minimize the risk of puncturing the separator. For example, $FeS_2$ is preferably sieved through a 230 mesh (63 μm) screen before use.

In a further embodiment, a cathode or positive electrode is disclosed which provides beneficial properties to an electrochemical cell incorporating the same therein. The cathode comprises $FeS_2$ particles having a predetermined average particle size produced by a wet milling method such as a media mill, or a dry milling method using a non-mechanical milling device such as a jet mill. Electrochemical cells prepared with the reduced average particle size $FeS_2$ particles exhibit increased cell voltage at any given depth of discharge, irrespective of cell size.

In one embodiment of the present invention, the cathode comprises small particle size $FeS_2$ particles, preferably natural, produced by a wet milling method, preferably utilizing a media mill. A media mill has also been referred to in the art as a ball mill, basket mill, bead mill, sand mill, rotary-tumbling mixer, or the like, which can use milling media in a wet milling process. The wet milling step is preferably performed in-line during cathode or positive electrode construction thereby substantially eliminating weathering or oxidation, as well as hazardous dry dust pyrite fires. By utilizing the wet milling process of the present invention, the above noted sieving operation can be eliminated.

In the wet milling method, a cathode electrochemically active material mixture is formed comprising the $FeS_2$ and a wetting agent. At this point in the process, the $FeS_2$ has an average particle size greater than 20 μm. Any of the above described active or inactive materials such as, but not limited to, binders, conductive material, additives, etc. can also be utilized in the active material mixture, if desired. In one embodiment, the cathode active material mixture components are combined and optionally, but preferably, mixed in a suitable vessel. The cathode active material mixture is metered into the media mill wherein the average particle size of the $FeS_2$ particles is reduced during milling. The dwell time of the cathode active material mixture within the media mill is sufficient to produce the desired $FeS_2$ average particle size range.

The wetting agent is any liquid or the like, preferably of a low viscosity, which substantially prevents the $FeS_2$ or the other components of the slurry from combusting during the milling process. The preferred wetting agent is a solvent which is generally non-flammable at processing conditions used during the wet milling operation. Examples of suitable wetting agents include, but are not limited to trichloroethylene, N-methyl-2-pyrrolidone (NMP), butyl glycol acetate, mineral spirits, and water. The wetting agent is selected to at least be compatible with and preferably able to substantially dissolve the binder utilized in preparation of the cathode. The amount of wetting agent can vary, and can generally range from about 0.1 cc to about 5 cc, and preferably is about 0.5 cc per gram of solid components of the cathode active material mixture.

The cathode active material slurry mixture is transferred to a milling device and milled at an appropriate flow rate and rotor rpm until the desired $FeS_2$ average particle size is achieved. A media mill is utilized in a preferred embodiment. Media mills typically comprise shaft mounted rotating disks and/or rotors as well as grinding media in order to reduce particle size of components of the composition to be milled. Grinding media can be substantially spherical, cylindrical or the like, with spheres being preferred, with mean diameters which range from about 0.2 mm to about 30 mm, and desirably about 0.5 to about 10 mm, and preferably from about 1.2 to about 1.7 mm. Cylinder height ranges from about 1 mm to about 20 mm with about 5 to about 15 mm preferred. Numerous types of media can be utilized and include, but are not limited to, soda lime, zirconia-silica, alumina oxide, yittria stabilized zirconia silica, chrome steel, zirconium silicate, cerium stabilized zirconia, yittria stabilized zirconia, and tungsten carbide. Suitable grinding media are available from suppliers such as Saint-Gobain of Worcester, Mass. as Glass, ER120, Zirstar and Zirmil; Glenn Mill of Clifflon, N.J. as Alumina, Steel, and Carbide; and Jyoti Ceramic Industries of Satpur, Nashik, India as Zirconox and Zircosil. A suitable media mill is available from Morehouse-COWLES of Fullerton, Calif.

The cathode active material slurry mixture is transferred to the milling chamber of the media mill which contains grinding media and preferably shaft mounted rotatable rotors. The media is accelerated at a relatively high velocity through the slurry towards the milling chamber wall thereby impacting, shearing, and reducing the size of the slurry mixture particles. The milled slurry mixture is subsequently discharged from the media mill for further processing into a cathode after a desired average particle size of $FeS_2$ particles has been achieved.

After processing utilizing the wet milling method of the invention, the $FeS_2$ particles have an average particle size of about 1 to about 19 μm, desirably from about 2 to about 17 or about 18 μm and preferably from about 5 or about 10 to about 15 μm. The $FeS_2$ particles also have a narrower particle size distribution due to the media milling process performed thereon.

The wet milled active cathode material mixture is subsequently roll coated on a sheet such as aluminum foil as described hereinabove, and dried to remove the wetting agent. The coated foil laminate can then be calendered to compact the coating and produce a smooth surface, and the coated foil can be slit to a desired width and length for use in the assembly of an electrochemical cell, such as described herein.

In a further embodiment of the present invention, the cathode comprises $FeS_2$ particles, preferably natural, of a predetermined average particle size range obtained by a non-mechanical milling device, preferably a jet mill. The term "non-mechanical milling device" refers to an apparatus which does not utilize pressure or contact between two or more mill surfaces to reduce the particle size of a material such as by crushing, chipping, fracturing, or the like. Mechanical milling devices include, but are not limited to, roll mills, granulating mills, ball mills, media mills, bead mills, and hammer mills. Non-mechanical milling devices typically reduce average particle size of the $FeS_2$ particles without utilizing moving milling parts, and instead reduce size utilizing collisions between particles and/or particles and a single surface of the milling device.

A jet mill typically includes a central chamber into which a fluid such as air, steam, or gas is introduced through nozzles or jets which create a near-sonic, sonic or supersonic grinding stream. No grinding media are utilized. Particles of the feed material comprising $FeS_2$ particles are fed or injected into the high speed grinding stream in the jet mill. Size reduction results due to the high velocity collisions between particles of the iron disulfide or other particles themselves or collision with a mill surface. Jet mills are designed to allow recirculation of oversized particles, enhancing the incidence and effect of particle collisions. As the $FeS_2$ particles are reduced in size, they migrate towards a discharge port from which they are collected for use in an active material mixture utilized to form a cathode. In a preferred embodiment, the jet milling of the $FeS_2$ is performed in a inert atmosphere utilizing a gas such as nitrogen, argon, or the like with nitrogen being most preferred, in order to prevent ignition or combustion of the $FeS_2$ particles. Although heat may be generated by the friction of the $FeS_2$ particles rubbing over mill surfaces and from the collisions taking place in the mill, due at least to the Jewel-Thompson effect on air temperature when throttling, there is reportedly no net temperature increase during milling. The product temperature is substantially equal to the temperature of the fluid supplied to the mill. Jet mills are available from the Jet Pulverizer Company of Moorestown, N.J.; Sturtevant of Hanover, Mass.; as well as Fluid Energy of Telford, Pa.

After processing utilizing the non-mechanical or jet milling method of the invention, the $FeS_2$ particles have an average particle size of about 1 to about 19 μm, desirably from about 1.5 to about 10 or about 15 μm, and preferably from about 2 to about 6 μm. The jet milled $FeS_2$ particles have a particle size distribution wherein 80% of the total particles are between about 1.0 and about 15 μm, and preferably about 1.0 and about 10 μm. Particle size distribution was determined utilizing the Microtrac Honeywell Particle Size Analyzer X-100 described herein above, wherein sonification is utilized during testing in order to prevent aggregation of particles.

The milling processes of the present invention utilized to reduce the average particle size of the $FeS_2$ particles within the ranges stated herein have been shown to offer several advantages which include for example, improved low temperature battery performance, improved adhesion of the cathode active material mixture to the aluminum substrate, less damage to the polymer separator insulator film due to the small particle sizes of the active material mixture, improved cathode efficiency as a result of more pyrite particles with increased surface area to accept lithium ions upon cell discharge, improved cell operating voltage from decreased anode polarization which allows the cells to operate at lower currents on constant power device applications, and more efficient and uniform discharge at the opposing lithium anode as the current distribution can be more uniformly applied over it's interfacial surface area.

FR6 type electrochemical cells prepared utilizing wet milled $FeS_2$ particles or jet milled $FeS_2$ particles are capable of providing a discharge capacity of at least 3,000 milliamp-hours (mAh) when discharged at a rate of 200 mA continuously to one volt, as well as at least 2,700 mAh or preferably at least 2,800 mAh when discharged at a rate of 1 amp continuously to one volt at room temperature. Accordingly, the cells of the present invention provide excellent results for both low and high rate applications.

It has also been found that FR6 electrochemical cells utilizing jet milled $FeS_2$ particles as disclosed in the present invention have a discharge time generally of at least 300 minutes, desirably at least 320 minutes, preferably at least 325 minutes, and most preferably at least 330 or 340 minutes to 1.05 volts according to a 1500/650 mW $2/28$ s×10 per hour DSC test. It has also been found that FR6 type electrochemical cells comprising jet milled $FeS_2$ particles, having an average particle size within the range specified in the invention, maintain a voltage $\geq 1.2$ for at least 180 minutes, desirably at least 240 minutes, and preferably at least 270 minutes according to the 1500/650 mW $2/28$ s×10 per hour DSC test. The DSC procedure cycles the electrochemical cell utilizing two pulses, the first pulse at 1500 mW for 2 seconds followed by the second pulse at 650 mW for 28 seconds. The pulse sequence is repeated 10 times, followed by a rest period for 55 minutes. Afterwards, the pulse sequence and rest period are repeated to a predetermined voltage. Furthermore, it has been found that FR6 type electrochemical cells comprising wet milled $FeS_2$ particles maintain a voltage $\geq 1.2$ for at least 180 minutes, desirably at least 210 minutes, and preferably at least 230 minutes according to the 1500/650 mW $2/28$ s×10 per hour DSC test. FR6 type electrochemical cells utilizing wet milled $FeS_2$ particles have a discharge time generally of at least 300 minutes, and preferably at least 320 minutes to 1.05 volts according to the 1500/650 mW $2/28$ s×10 per hour DSC test. The measurements were performed at room temperature.

Figure 5:
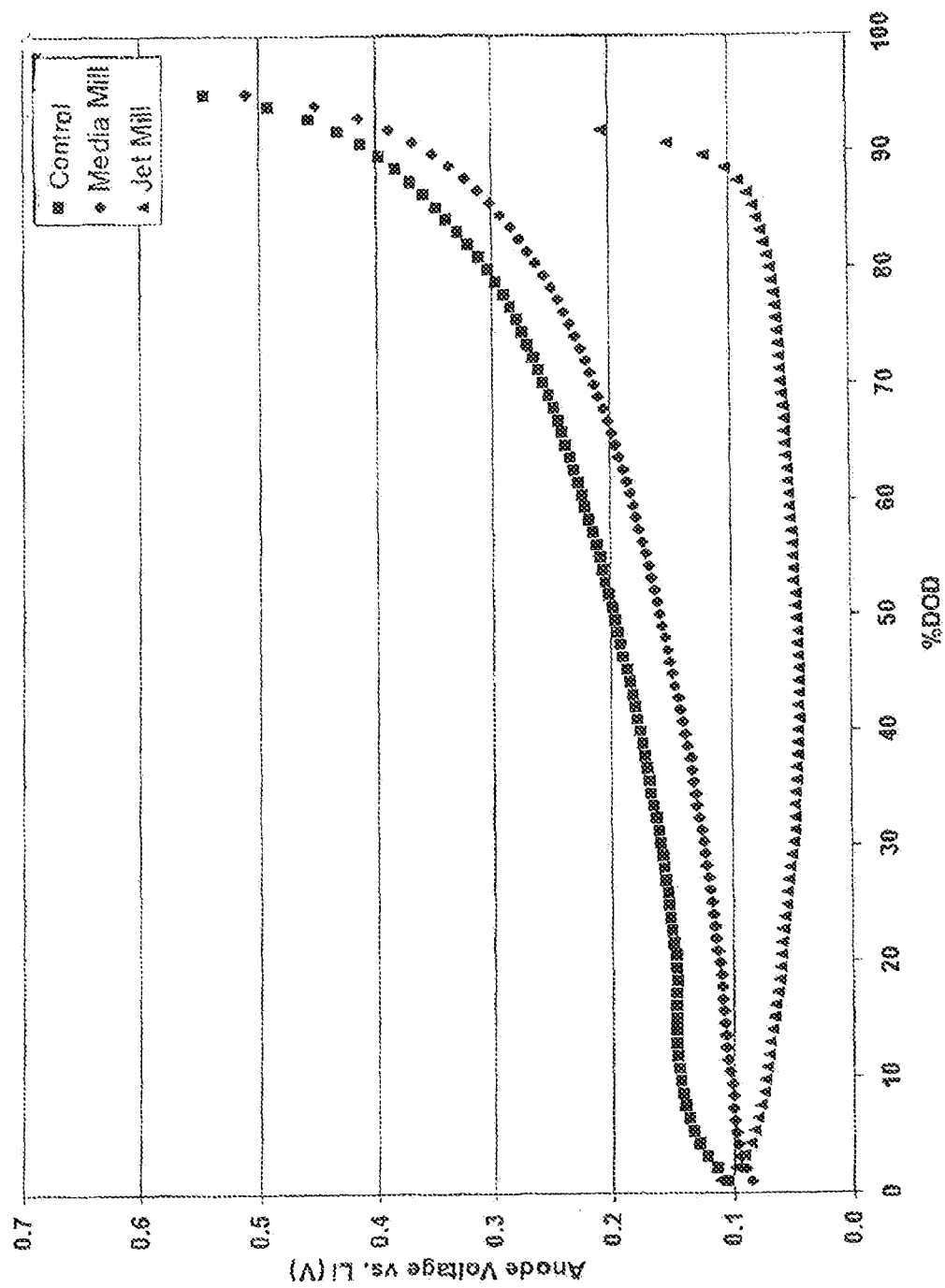
FIG. 5 is a graph of anode voltage as a function of percent depth of discharge for a prior art FeS$_2$-containing electrochemical cell, a cell containing media milled FeS$_2$ particles and a cell containing jet milled FeS$_2$ particles.

FR6 electrochemical cells prepared utilizing relatively small average particle size $FeS_2$ particles derived from the milling methods of the present invention such as wet or jet milling provide reduced anode voltage values at varying depth of discharge percentages when compared to prior art cells containing $FeS_2$ particles having an average size greater than or equal to about 22 micrometers as illustrated in FIG. 5. At 50% depth of discharge, the anode voltage for an electrochemical cell having $FeS_2$ particles of average particle size within the ranges of the present invention is less than 190 millivolts, desirably less than 170 millivolts, preferably less than 100 millivolts, and most preferably less than about 60 millivolts. At 25% depth of discharge the anode voltage is less than 140 millivolts, desirably less than 120 millivolts, and preferably less than 75 millivolts. In order to obtain the measurements, the cells were discharged using a Solartron 1470 available from Solartron Analytical, Farnborough, England. The current was chosen such that the current density was about 5 mA/cm$^2$. The cells were cycled 2 minutes at 1 amp and 5 minutes at 0 amps. The cells were referenced by removing the cell can bottom and suspending the cell in a beaker containing electrolyte, in this case, 0.75 moles per liter solvent (9.1% by weight) lithium iodide in a solvent blend of 1,3-dioxolane, 1,2-diethoxyethane and 3,5-dimethylisoxazole (63.1:27.6:0.20% by weight). The reference electrode, which is a strip of pure lithium metal in a syringe barrel with a Vycor tip, is located off to the side of the cell. The system is allowed to equilibrate for approximately 30 minutes before discharge. The measurements were performed at room temperature.

The cathode is electrically connected to the positive terminal of the cell. This may be accomplished with an electrical lead, often in the form of a thin metal strip or a spring, as shown in FIG. 1. The lead is often made from nickel plated stainless steel.

The separator is a thin microporous membrane that is ion-permeable and electrically nonconductive. It is capable of holding at least some electrolyte within the pores of the separator. The separator is disposed between adjacent surfaces of the anode and cathode to electrically insulate the electrodes from each other. Portions of the separator may also insulate other components in electrical contact with the cell terminals to prevent internal short circuits. Edges of the separator often extend beyond the edges of at least one electrode to insure that the anode and cathode do not make electrical contact even if they are not perfectly aligned with each other. However, it is desirable to minimize the amount of separator extending beyond the electrodes.

To provide good high power discharge performance it is desirable that the separator have the characteristics (pores with a smallest dimension of at least 0.005 µm and a largest dimension of no more than 5 µm across, a porosity in the range of 30 to 70 percent, an area specific resistance of from 2 to 15 ohm-cm$^2$ and a tortuosity less than 2.5) disclosed in U.S. Pat. No. 5,290,414, issued Mar. 1, 1994, and hereby incorporated by reference. Suitable separator materials should also be strong enough to withstand cell manufacturing processes as well as pressure that may be exerted on the separator during cell discharge without tears, splits, holes or other gaps developing that could result in an internal short circuit.

To minimize the total separator volume in the cell, the separator should be as thin as possible, but at least about 1 µm or more so a physical barrier is present between the cathode and anode to prevent internal short circuits. That said, the separator thickness ranges from about 1 to about 50 µm, desirably from about 5 to about 25 µm, and preferably from about 10 to about 16 or about 20 µm. The required thickness will depend in part on the strength of the separator material and the magnitude and location of forces that may be exerted on the separator where it provides electrical insulation.

A number of characteristics besides thickness can affect separator strength. One of these is tensile stress. A high tensile stress is desirable, preferably at least 800, more preferably at least 1000 kilograms of force per square centimeter (kgf/cm$^2$). Because of the manufacturing processes typically used to make microporous separators, tensile stress is typically greater in the machine direction (MD) than in the transverse direction (TD). The minimum tensile stress required can depend in part on the diameter of the cell. For example, for a FR6 type cell the preferred tensile stress is at least 1500 kgf/cm$^2$ in the machine direction and at least 1200 kgf/cm$^2$ in the transverse direction, and for a FR03 type cell the preferred tensile strengths in the machine and transverse directions are 1300 and 1000 kgf/cm$^2$, respectively. If the tensile stress is too low, manufacturing and internal cell forces can cause tears or other holes. In general, the higher the tensile stress the better from the standpoint of strength. However, if the tensile stress is too high, other desirable properties of the separator may be adversely affected.

Tensile stress can also be expressed in kgf/cm, which can be calculated from tensile stress in kgf/cm$^2$ by multiplying the later by the separator thickness in cm. Tensile stress in kgf/cm is also useful for identifying desirable properties related to separator strength. Therefore, it is desirable that the separator have a tensile stress of at least 1.0 kgf/cm, preferably at least 1.5 kgf/cm and more preferably at least 1.75 kgf/cm in both the machine and transverse directions. For cells with diameters greater than about 0.45 inch (11.4 mm), a tensile stress of at least 2.0 kgf/cm is most preferable.

Another indicator of separator strength is its dielectric breakdown voltage. Preferably the average dielectric breakdown voltage will be at least 2000 volts, more preferably at least 2200 volts. For cylindrical cells with a diameter greater than about 0.45 in (11.4 mm), the average dielectric breakdown voltage is most preferably at least 2400 volts. If the dielectric breakdown voltage is too low, it is difficult to reliably remove cells with defective or damaged separators by electrical testing (e.g., retention of a high voltage applied to the electrode assembly before the addition of electrolyte) during cell manufacturing. It is desirable that the dielectric breakdown is as high as possible while still achieving other desirable separator properties.

The average effective pore size is another of the more important indicators of separator strength. While large pores are desirable to maximize ion transport through the separator, if the pores are too large the separator will be susceptible to penetration and short circuits between the electrodes. The preferred maximum effective pore size is from 0.08 µm to 0.40 µm, more preferably no greater than 0.20 µm.

The BET specific surface area is also related to pore size, as well as the number of pores. In general, cell discharge performance tends to be better when the separator has a higher specific surface area, but the separator strength tends to be lower. It is desirable for the BET specific surface area to be no greater than 40 m$^2$/g, but it is also desirable that it be at least 15 m$^2$/g, more preferably at least 25 m$^2$/g.

For good high rate and high power cell discharge performance a low area specific resistance is desirable. Thinner separators tend to have lower resistances, but the separator should also be strong enough, limiting how thin the separator can be. Preferably the area specific resistance is no greater than 4.3 ohm-cm$^2$, more preferably no greater than 4.0 ohm-cm$^2$, and most preferably no greater than 3.5 ohm-cm$^2$.

Separator membranes for use in lithium batteries are often made of polypropylene, polyethylene or ultrahigh molecular weight polyethylene, with polyethylene being preferred. The separator can be a single layer of biaxially oriented microporous membrane, or two or more layers can be laminated together to provide the desired tensile strengths in orthogonal directions. A single layer is preferred to minimize the cost. Suitable single layer biaxially oriented polyethylene microporous separator is available from Tonen Chemical Corp., available from EXXON Mobile Chemical Co., Macedonia, N.Y., USA. Setela F20DHI grade separator has a 20 µm nominal thickness, and Setela 16MMS grade has a 16 µm nominal thickness.

The anode, cathode and separator strips are combined together in an electrode assembly. The electrode assembly may be a spirally wound design, such as that shown in FIG. 1, made by winding alternating strips of cathode, separator, anode and separator around a mandrel, which is extracted from the electrode assembly when winding is complete. At least one layer of separator and/or at least one layer of electrically insulating film (e.g., polypropylene) is generally wrapped around the outside of the electrode assembly. This serves a number of purposes: it helps hold the assembly together and may be used to adjust the width or diameter of the assembly to the desired dimension. The outermost end of the separator or other outer film layer may be held down with a piece of adhesive tape or by heat sealing.

Rather than being spirally wound, the electrode assembly may be formed by folding the electrode and separator strips together. The strips may be aligned along their lengths and then folded in an accordion fashion, or the anode and one electrode strip may be laid perpendicular to the cathode and another electrode strip and the electrodes alternately folded one across the other (orthogonally oriented), in both cases forming a stack of alternating anode and cathode layers.

The electrode assembly is inserted into the housing container. In the case of a spirally wound electrode assembly, whether in a cylindrical or prismatic container, the major surfaces of the electrodes are perpendicular to the side wall(s) of the container (in other words, the central core of the electrode assembly is parallel to a longitudinal axis of the cell). Folded electrode assemblies are typically used in prismatic cells. In the case of an accordion-folded electrode assembly, the assembly is oriented so that the flat electrode surfaces at opposite ends of the stack of electrode layers are adjacent to opposite sides of the container. In these configurations the majority of the total area of the major surfaces of the anode is adjacent the majority of the total area of the major surfaces of the cathode through the separator, and the outermost portions of the electrode major surfaces are adjacent to the side wall of the container. In this way, expansion of the electrode assembly due to an increase in the combined thicknesses of the anode and cathode is constrained by the container side wall(s).

A nonaqueous electrolyte, containing water only in very small quantities as a contaminant (e.g., no more than about 500 parts per million by weight, depending on the electrolyte salt being used), is used in the battery cell of the invention. Any nonaqueous electrolyte suitable for use with lithium and active cathode material the may be used. The electrolyte contains one or more electrolyte salts dissolved in an organic solvent. For a $Li/FeS_2$ cell examples of suitable salts include lithium bromide, lithium perchlorate, lithium hexafluorophosphate, potassium hexafluorophosphate, lithium hexafluoro-arsenate, lithium trifluoromethanesulfonate and lithium iodide; and suitable organic solvents include one or more of the following: dimethyl carbonate, diethyl carbonate, methylethyl carbonate, ethylene carbonate, propylene carbonate, 1,2-butylene carbonate, 2,3-butylene carbonate, methyl formate, γ-butyrolactone, sulfolane, acetonitrile, 3,5-dimethylisoxazole, n,n-dimethyl formamide and ethers. The salt/solvent combination will provide sufficient electrolytic and electrical conductivity to meet the cell discharge requirements over the desired temperature range. Ethers are often desirable because of their generally low viscosity, good wetting capability, good low temperature discharge performance and good high rate discharge performance. This is particularly true in $Li/FeS_2$ cells because the ethers are more stable than with $MnO_2$ cathodes, so higher ether levels can be used. Suitable ethers include, but are not limited to acyclic ethers such as 1,2-dimethoxyethane, 1,2-diethoxyethane, di(methoxyethyl)ether, triglyme, tetraglyme and diethyl ether; and cyclic ethers such as 1,3-dioxolane, tetrahydrofuran, 2-methyl tetrahydrofuran and 3-methyl-2-oxazolidinone.

Accordingly, various combinations of electrolyte salts and organic solvents can be utilized to form the electrolyte for electrochemical cells. The molar concentration of the electrolyte salt can be varied to modify the conductive properties of the electrolyte. Examples of suitable nonaqueous electrolytes containing one or more electrolyte salts dissolved in an organic solvent include, but are not limited to, a 1 mole per liter solvent concentration of lithium trifluoromethanesulfonate (14.60% by weight) in a solvent blend of 1,3-dioxolane, 1,2-diethoxyethane, and 3,5-dimethyl isoxazole (24.80:60.40:0.20% by weight) which has a conductivity of 2.5 mS/cm; a 1.5 moles per liter solvent concentration of lithium trifluoro-methanesulfonate (20.40% by weight) in a solvent blend of 1,3-dioxolane, 1,2-diethoxyethane, and 3,5-dimethylisoxazole (23.10:56.30:0.20% by weight) which has a conductivity of 3.46 mS/cm; and a 0.75 mole per liter solvent concentration of lithium iodide (9.10% by weight) in a solvent blend of 1,3-dioxolane, 1,2-diethoxyethane, and 3,5-dimethylisoxazole (63.10:27.60:0.20% by weight) which has a conductivity of 7.02 mS/cm. Electrolytes utilized in the electrochemical cells of the present invention have conductivity generally greater than about 2.0 mS/cm, desirably greater than about 2.5 or about 3.0 mS/cm, and preferably greater than about 4, about 6, or about 7 mS/cm.

Specific anode, cathode and electrolyte compositions and amounts can be adjusted to provide the desired cell manufacturing, performance and storage characteristics.

The cell can be closed and sealed using any suitable process. Such processes may include, but are not limited to, crimping, redrawing, collecting and combinations thereof. For example, for the cell in FIG. 1, a bead is formed in the can after the electrodes and insulator cone are inserted, and the gasket and cover assembly (including the cell cover, contact spring and vent bushing) are placed in the open end of the can. The cell is supported at the bead while the gasket and cover assembly are pushed downward against the bead. The diameter of the top of the can above the bead is reduced with a segmented collet to hold the gasket and cover assembly in place in the cell. After electrolyte is dispensed into the cell through the apertures in the vent bushing and cover, a vent ball is inserted into the bushing to seal the aperture in the cell cover. A PTC device and a terminal cover are placed onto the cell over the cell cover, and the top edge of the can is bent inward with a crimping die to hold retain the gasket, cover assembly, PTC device and terminal cover and complete the sealing of the open end of the can by the gasket.

The above description is particularly relevant to cylindrical $Li/FeS_2$ cells, such as FR6 and FR03 types, as defined in International Standards IEC 60086-1 and IEC 60086-2, published by the International Electrotechnical Commission, Geneva, Switzerland. However, the invention may also be adapted to other cell sizes and shapes and to cells with other electrode assembly, housing, seal and pressure relief vent designs.

Features of the invention and advantages thereof are further illustrated in the following examples, wherein unless otherwise noted, experiments were conducted at room temperature:

Example 1

FR6 type cylindrical $Li/FeS_2$ cells with spirally wound electrode assemblies were made with varying electrode assembly void volumes per centimeter of interfacial electrode assembly height over a range of about 0.373 to about 0.455 cm³/cm. The void volumes were varied by adjusting the volume of the voids within the active material mixture coated on the cathode. This was done with various combinations of mixture formulations, thickness and packing. The separator material used in all cells was a highly crystalline, unixially oriented, microporous polypropylene material with a 25 μm nominal thickness.

Example 2

Samples of the cells from Example 1 were prepared for testing. For each group with a given void volume per unit of height, some cells remained undischarged and some cells were 50% discharged (discharged at a rate of 200 mA for the time required to remove 50 percent of the rated capacity). Undischarged and 50% discharged cells were tested on an Impact Test, and the external temperature of each of the cells tested was monitored during and for six hours after testing.

For the Impact Test a sample cell is placed on a flat surface, a 15.8 mm diameter bar is placed across the center of the sample, and a 9.1 kg mass is dropped from a height of 61±2.5 cm onto the sample. The sample cell is impacted with its longitudinal axis parallel to the flat surface and perpendicular to the longitudinal axis of the 15.8 mm diameter bar lying across the center of the cell. Each sample is subjected to only a single impact.

Figure 2:
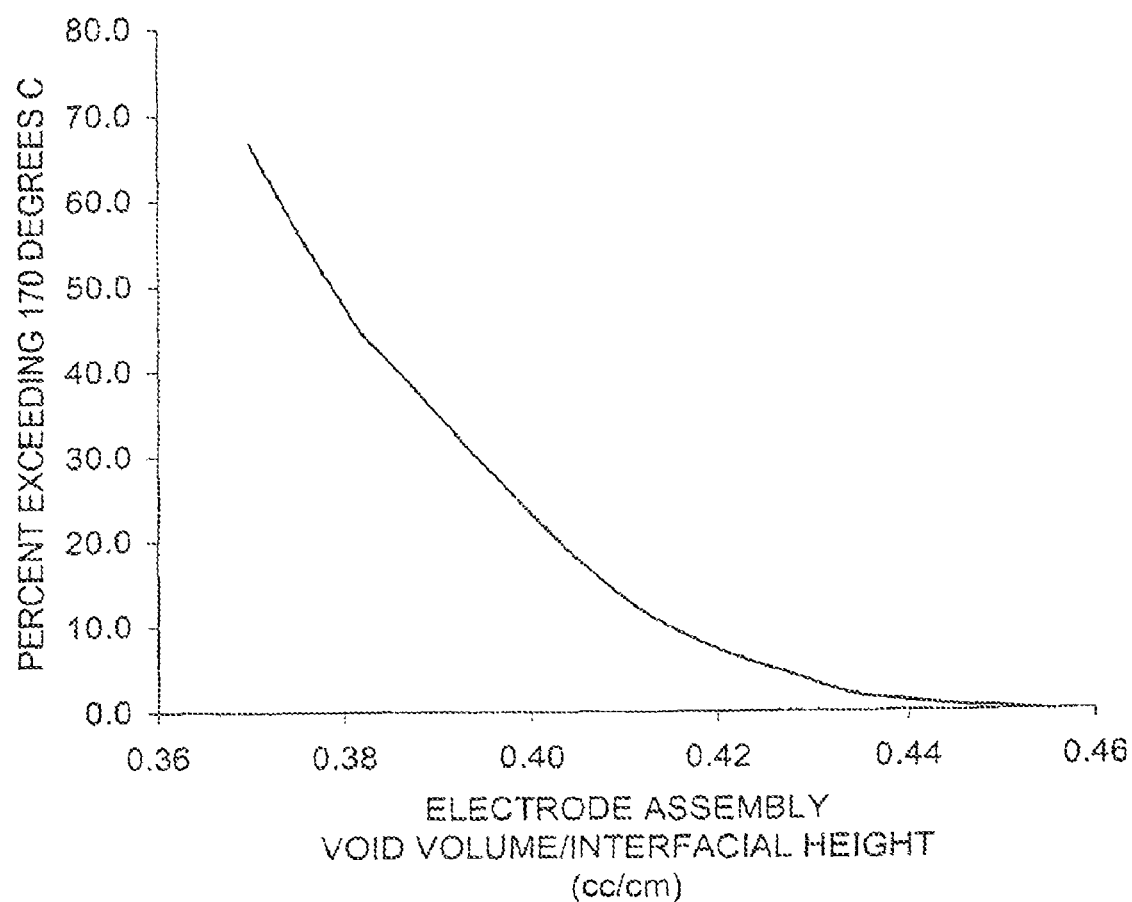
FIG. 2 is a graph showing Impact Test results for partially discharged FR6 cells as a function of the volume of voids per unit height of the electrode assembly within the interfacial height.

None of the undischarged cells had an external temperature that exceeded 170° C. The percentage of 50% discharged cells whose external temperatures exceeded 170° C. was plotted. The best curve fitting the plotted points is shown in FIG. 2, where the void volume per unit height (in $cm^3/cm$) is on the x-axis, and the percentage of cells with an external temperature exceeding 170° C. is on the y-axis.

The Impact Test results show that as the electrode assembly void volume decreases, the percentage of cells with an external temperature exceeding 170° C. increases. From the graph in FIG. 2, 0% of the cells with a void volume of approximately 0.45 $cm^3/cm$ of interfacial height would be predicted to have an external temperature exceeding 170° C., and over 60% with a void volume of approximately 0.37 $cm^3/cm$ would be predicted to exceed 170° C. The high external temperatures were attributed to damage to the separator resulting in heat-generating internal short circuits.

Subsequent examination of both FR6Li/FeS$_2$ cells after different levels of discharge revealed that a net increase in the FR6 cell total electrode volume, which becomes greater as discharge proceeds, causes bending and buckling of the electrode strips and collapsing of the central core of the electrode assembly by the time the cells are 50% discharged. In contrast, similar examination of Li/MnO$_2$ cells with spirally wound electrodes showed little if any discernable change in the electrode assembly at 50% discharge. The difference between the active material volumes and the volumes of the discharge reaction products provides an explanation for the difference in the effects of discharge on the spirally wound electrode assemblies of Li/FeS$_2$ vs. Li/MnO$_2$ cells.

Example 3

Four lots of FR6 cells were made, each with a separator made from a different material. A description of the separator materials is provided in Table 1, and typical separator properties, as determined by the methods described below, are summarized in Table 2. The separator material used for Lot A is the same as that used in the cells in Example 1. Each cell contained about 1.60 g of electrolyte, the electrolyte consisting of 9.14 weight percent LiI salt in a solvent blend of 1,3-dioxolane, 1,2-dimethoxyethane and 3,5-dimethylisoxazole (63.05:27.63:0.18 by weight).

TABLE 1

| Lot A | Lot B | Lot C | Lot D |
|---|---|---|---|
| highly crystalline uniaxially oriented microporous polypropylene 25 μm thick | highly crystalline uniaxially oriented microporous polypropylene 20 μm thick | amorphous biaxially oriented microporous ultrahigh molecular weight polyethylene 20 μm thick | amorphous biaxially oriented microporous polyethylene 20 μm thick |

TABLE 2

| Property (units) | Lot A | Lot B | Lot C | Lot D |
|---|---|---|---|---|
| Porosity (%) | 38 | 38 | 42 | 40 |
| Max. effective pore size (μm) | 0.10 | 0.06 | 0.38 | 0.10 |
| Dielectric breakdown volt. (V) | 2700 | 2200 | 1600 | 2625 |
| Tensile stress, TD (kgf/cm$^2$) | 190 | 162 | 844 | 1336 |
| Tensile stress, TD (kgf/cm) | 0.475 | 0.324 | 1.688 | 2.672 |
| Tensile stress, MD (kgf/cm$^2$) | 1687 | 2671 | 1541 | 1828 |
| Tensile stress, MD (kgf/cm) | 4.218 | 5.342 | 3.082 | 3.656 |
| Tensile elongation, TD (%) | 1000 | 790 | 440 | 320 |
| Tensile elongation, MD (%) | 120 | 54 | 260 | 225 |
| Area specific resist. (Ω-cm$^2$) | 4.59 | 2.71 | 3.06 | 2.90 |
| BET spec. surf. area (m$^2$/g) | 44.0 | 48.9 | 16.2 | 36.4 |

The same cell design was used for all of Lots A-D. The cell design was one with greater amounts of active materials, a higher concentration of FeS$_2$ in the cathode mixture and an increased electrode interfacial surface area, as well as a lower anode:cathode total input capacity ratio, than cells from Example 1 with an electrode assembly void volume to interfacial height ratio of about 0.452, resulting in a 22% increase in the cell interfacial capacity.

Example 4

Cells from each lot in Example 3 were discharged 50% and then tested on the Impact Test. The percentage of cells exceeding 170° C. on the test was 20% for Lot A, 80% for Lot B and 0% for Lots C and D.

By increasing the interfacial capacity 22% compared to cells from Example 1 with an electrode assembly void volume to interfacial height ratio of about 0.452, the percentage of cells exceeding 170° C. on the Impact Test increased from 0% to 20%. Cells from Lot A had a reduced amount of void space to accommodate a net increase in volume of discharge reaction products compared the volume of the unreacted active materials, increasing the adverse effects of discharge on the Li/FeS$_2$ electrode assembly observed in Example 2.

The reduced separator material thickness in Lot B compared to Lot A contributed in a further increase in the percentage of cells exceeding 170° C. on the Impact Test from 20% to 80%.

Although the thicknesses of the separator materials in Lots C and D were the same as the thickness of the Lot B separator, there were no cells in either Lot C or Lot D. The results for Lots C and D were comparable to those for cells from Example 1 with an electrode assembly void volume to interfacial height ratio of about 0.452, even though the void volume within the cathode and the separator material thickness were both reduced in Lots C and D.

Example 5

Three lots of FR6 cells were used to compare actual performance of FR6 cells on relatively low rate and high rate discharge tests. The first lot was Lot D from Example 3. Features of Lot D are summarized in Table 3. The values listed are nominal values and can vary within typical manufacturing tolerances.

Cells in Lots E and F were made according to the prior art. The cells in Lot F were like those in Example 1 with an electrode assembly void volume to interfacial height ratio of about 0.452. The features of Lots E and F are shown in Table 3. In Lot E the same separator material as that in Lot F was used, but in Lot E the cathode mixture composition was modified and the cell interfacial capacity was increased by 18% compared to Lot F. The use of a thinner (20 μm thick) separator in Lot D allowed a 22% increase in cell interfacial capacity compared to Lot F.

TABLE 3

| Feature | | Lot D | Lot E | Lot F |
|---|---|---|---|---|
| Anode | | Li—Al | Li—Al | Li—Al |
| Li foil thickness (cm) | | 0.01524 | 0.01524 | 0.01524 |
| Li foil width (cm) | | 3.899 | 3.899 | 3.861 |
| Li foil cut length (cm) | | 31.50 | 30.48 | 30.61 |
| Li foil weight (g) | | 0.99 | 0.97 | 0.95 |
| Li input capacity/cell (mAh) | | 3859 | 3735 | 3664 |
| Anode interfacial capacity/cell (mAh) | | 3600 | 3485 | 3470 |
| Cathode | | | | |
| Al current collector thickness (cm) | | 0.00254 | 0.00254 | 0.00254 |
| Current collector volume (cm$^3$) | | 0.3313 | 0.3199 | 0.3186 |
| Dry coating (wt %): | FeS$_2$ | 92.00 | 92.00 | 92.75 |
| | acetylene black | 1.40 | 1.40 | 2.5 |
| | graphite | 4.00 MX15 | 4.0 MX15 | 2.25 KS6 |
| | binder | 2.00 SEBS | 2.0 SEBS | 2.00 PEPP |
| | other | 0.3 PTFE | 0.3 PTFE | 0.05 PEO |
| | other | 0.3 silica | 0.3 silica | |
| Coating real density (g/cm$^3$) | | 4.115 | 4.115 | 4.116 |
| Coating thickness (ea. side) (cm) | | 0.0080 | 0.0080 | 0.0072 |
| Coating loading (mg/cm$^2$) | | 21.26 | 21.26 | 16.98 |
| Coating packing (%) | | 64 | 64 | 57 |
| Coating width (cm) | | 4.077 | 4.077 | 4.039 |
| Cathode (coating) length (cm) | | 29.85 | 28.83 | 28.96 |
| Coating weight/cell (g) | | 5.17 | 5.00 | 3.97 |
| Cathode input capacity/cell (mAh) | | 4250 | 4110 | 3290 |
| Cathode interfacial capacity/cell (mAh) | | 4005 | 3877 | 3105 |
| Separator (2 pieces/cell) | | | | |
| Material | | 20 μm PE | 25 μm PP | 25 μm PP |
| Length/piece (cm) | | 39.5 | 39 | 39 |
| Width/piece (cm) | | 44 | 44 | 44 |
| Total volume (cm$^3$) | | 0.431 | 0.425 | 0.532 |
| Electrode Assembly | | | | |
| Winding mandrel diameter (cm) | | 0.4 | 0.4 | 0.4 |
| Overwrap volume (cm$^3$) | | 0.124 | 0.124 | 0.124 |
| interfacial height (cm) | | 3.899 | 3.899 | 3.861 |
| Can | | Ni pltd. steel | Ni pltd. steel | Ni pltd. steel |
| Thickness (cm) | | 0.0241 | 0.0241 | 0.0241 |
| Outside diameter (cm) | | 1.392 | 1.392 | 1.379 |
| Inside diameter (cm) | | 1.344 | 1.344 | 1.331 |
| Cell | | | | |
| Internal void volume (%) | | 10 | 10 | 12 |
| Anode/cathode input capacity | | 0.95 | 0.95 | 1.18 |
| Interfacial capacity (mAh) | | 3600 | 3485 | 3105 |
| Cathode cap./interfac. vol. (mAh/cm$^3$) | | 724 | 701 | 578 |

Example 6

Cells from each of Lots D, E and F were discharged at 200 mA continuously to 1.0 volt and at 1000 mA continuously to 1.0 volt. Table 4 compares the results

TABLE 4

| Test | Lot D | Lot E | Lot F |
|---|---|---|---|
| 200 mA | 3040 mAh | 2890 mAh | 2417 mAh |
| 1000 mA | 2816 mAh | 2170 mAh | 2170 mAh |

The following separator material properties are determined according to the corresponding methods. Unless otherwise specified, all disclosed properties are as determined at room temperature (20-25° C.).

Tensile stress was determined using an Instron Model 1123 Universal Tester according to ASTM D882-02. Samples were cut to 0.50 inches (1.27 cm) by 1.75 inches (4.45 cm). The initial jaw separation was 1 inch (2.54 cm) and the strain rate was 2 inches (5.08 cm) per minute. Tensile stress was calculated as applied force divided by the initial cross sectional area (the width of the sample perpendicular to the applied force times the thickness of the sample).

Maximum effective pore diameter was measured on images made at 30,000 times magnification using a Scanning Electron Microscope and covering an area of 4 µm×3 µm. For each separator sample, an image was made of both major surfaces. On each image, the largest pores were measured to determine the largest round diameter that would fit within the pore wall (the maximum effective diameter of the individual pores). The maximum effective pore diameter of the sample was calculated by averaging the maximum effective pore diameters of the two largest pores on each side (i.e., the average of four individual pores).

Porosity was determined by (1) cutting a sample of the separator, (2) weighing the sample, (3) measuring the length, width, and thickness of the sample, (3) calculating the density from the weight and measurements, (4) dividing the calculated density by the theoretical density of the separator polymer resin, as provided by the separator manufacturer, (5) multiplying the dividend by 100, and (5) subtracting this value from 100.

Dielectric breakdown voltage was determined by placing a sample of the separator between two stainless steel pins, each 2 cm in diameter and having a flat circular tip, and applying an increasing voltage across the pins using a Quadtech Model Sentry 20 hipot tester, and recording the displayed voltage (the voltage at which current arcs through the sample).

Tensile elongation (elongation to break) was determined using an Instron Model 1123 Universal Tester according to ASTM D882-02. Samples were cut to 0.50 inches (1.27 cm) by 1.75 inches (4.45 cm). The initial jaw separation was 1 inch (2.54 cm) and the strain rate was 2 inches (5.08cm) per minute. Tensile elongation was calculated by subtracting the initial sample length from the sample length at break, dividing the remainder by the initial sample length and multiplying the dividend by 100 percent.

Area Specific Resistance (ASR) was determined for separator samples suspended in an electrolyte between two platinum electrodes, using a Model 34 Conductance-Resistance Meter from Yellow Springs Instrument, Yellow Springs, Ohio, USA, to make resistance measurements. The electrolyte solution used was 9.14 weight percent LiI salt in a solvent blend of 1,3-dioxolane, 1,2-dimethoxyethane and 3,5-dimethylisoxazole (63.05:27.63:0.18 by weight). All testing was done in an atmosphere of less than 1 part per million of water and less than 100 parts per million of oxygen. An electrically nonconductive sample holder, designed to hold the separator sample with a 1.77 $cm^2$ area of the separator exposed, was submerged in the electrolyte solution so that the portion of the holder for holding the sample lay halfway between two platinum electrodes, 0.259 cm apart. The resistance between the electrodes was measured. The holder was removed from the electrolyte, a separator sample inserted in the holder, and the holder was slowly lowered into the electrolyte solution to the same set level so that the sample was completely flooded with electrolyte with no gas bubbles entrapped in the sample. The resistance was measured. The ASR was calculated using the formula:

$$ASR = A(R_2 - R_1 + \rho L/A)$$

where A is the area of the exposed separator sample, $R_2$ is the resistance value with the film present, $R_1$ is the resistance value without the film, L is the separator sample thickness and $\rho$ is the conductivity of the electrolyte used.

Specific surface area was determined by the BET method, using a TriStar gas adsorption analyzer from Micromeritics Instrument Corporation, Norcross, Ga., USA. A sample of 0.1 g to 0.2 g of the separator was cut into pieces of less than 1 $cm^2$ to fit the sample holder, the sample was degassed under a stream of nitrogen at 70° C. for 1 hour, and a pore size distribution analysis was performed using nitrogen as the adsorbant gas and collecting full adsorption/desorption isotherms.

Example 7

Figure 3B:
FIG. 3b illustrates a SEM micrograph at 1,000 times magnification of a portion of a positive electrode containing FeS$_2$ particles produced utilizing the media milling process of the invention.
Figure 3A:
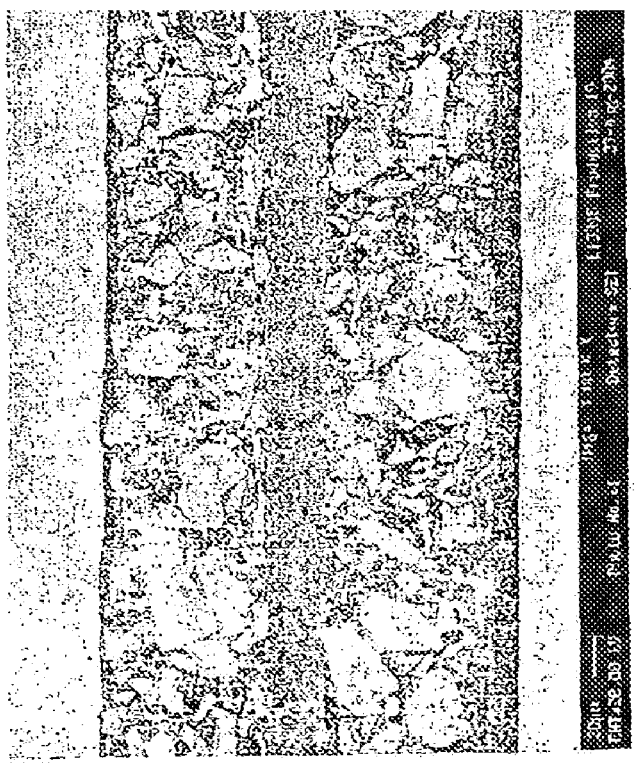
FIG. 3a illustrates a SEM micrograph at 1,000 times magnification of a portion of a positive electrode containing prior art FeS$_2$ particles.

Cylindrical FR6 type lithium/$FeS_2$ cells having spirally wound electrode assemblies were constructed with varying average particle size $FeS_2$ particles of 22 µm (control), coarse size $FeS_2$ of 75 µm, media milled $FeS_2$ between 5 and 10 µm (calculated estimate), and jet milled $FeS_2$ of 4.9 µm. The cells were identical to the cells of Lot D of Table 3 except for $FeS_2$ average particle size and typical and expected process variation. FIGS. 3a and 3b are SEM photographs of cross sections of coated cathodes made with conventional (unmilled) and media milled cathode slurry mixtures, respectively.

The discharge time of each cell was tested using the 1500/650 mW ⅔s s×10 per hour DSC test described hereinabove. The results are illustrated in Tables 5a and 5b. Two sets of tests were conducted with the media milled $FeS_2$-containing cells.

TABLE 5a

| | Average Particle Size $FeS_2$ | | | |
|---|---|---|---|---|
| Service FEP | Coarse MV = 75 µm | Control MV = 22 µm | Jet Milled MV = 4.9 µm | Improvement |
| 1.2 V | 37 min. | 194 min. | 296 min. | 1.52 |
| 1.1 V | 175 min. | 288 min. | 332 min. | 1.15 |
| 1.05 V | 214 min. | 314 min. | 340 min. | 1.08 |
| 1.0 V | 243 min. | 331 min. | 345 min. | 1.04 |

TABLE 5b

| Service FEP | Control 22 μm | Media Milled 5-10 μm | Improvement | Control 22 μm | Media Milled 5.2 μm | Improvement |
|---|---|---|---|---|---|---|
| 1.2 V | 188 min. | 236 min. | 1.25 | 184 min. | 230 min. | 1.25 |
| 1.1 V | 281 min. | 311 min. | 1.11 | 277 min. | 304 min. | 1.10 |
| 1.05 V | 305 min. | 329 min. | 1.08 | 300 min. | 322 min. | 1.07 |
| 1.0 V | 318 min. | 338 min. | 1.06 | 314 min. | 331 min. | 1.05 |

As evident from Tables 5a and 5b, it is illustrated that cells prepared with the media and jet milled $FeS_2$ particles provide a substantially longer discharge time to 1.05 volts when compared to the prior art control $FeS_2$ particles of 22 μm average particle size and coarse sized $FeS_2$ particles of 75 μm average particle size. The media milled $FeS_2$-containing cells also maintained a cut voltage of $\geq 1.2$ for an average 69.6% of service time $\geq 1$ volt, whereas the control only maintained such voltage for an average of 58.9% of service time. Likewise, the jet milled $FeS_2$-containing cell maintained a cut voltage of $\geq 1.2$ for 85.7% of discharge time a 1 volt.

Example 8

FR6 type cylindrical lithium/$FeS_2$ cells with spirally wound electrode assemblies were constructed. Average $FeS_2$ particle size, electrolyte composition, and separator thickness were varied as set forth in Table 6. The rest of the cell features were the same as described for Lot D of Table 3 except for typical and expected process variation. Cells 1-4 represent prior art cells.

TABLE 6

| Cell | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| $FeS_2$ average particle size | 22 μm | | | | 5-10 μm* (media milled) | | | | 22 μm | | | | 5-10 μm (media milled) | | | |
| Separator thickness (μm) | 50 | 25 | 20 | 16 | 50 | 25 | 20 | 16 | 50 | 25 | 20 | 16 | 50 | 25 | 20 | 16 |
| Electrolyte | 1.5 moles per liter solvent lithium trifluoromethanesulfonate (20.4% by wt.) in 1,3-dioxolane, 1,2-diethoxyethane, and 3,5-dimethylisoxazole (23.1:56.4:0.2% by wt.) | | | | | | | | 0.75 moles per liter solvent lithium iodide (9.1% by wt.) in 1,3-dioxolane, 1,2-diethoxyethane, and 3,5 dimethylisoxazole (63.1:27.6:0.2% by wt.) | | | | | | | |

*(calculated estimate)

Figure 4:
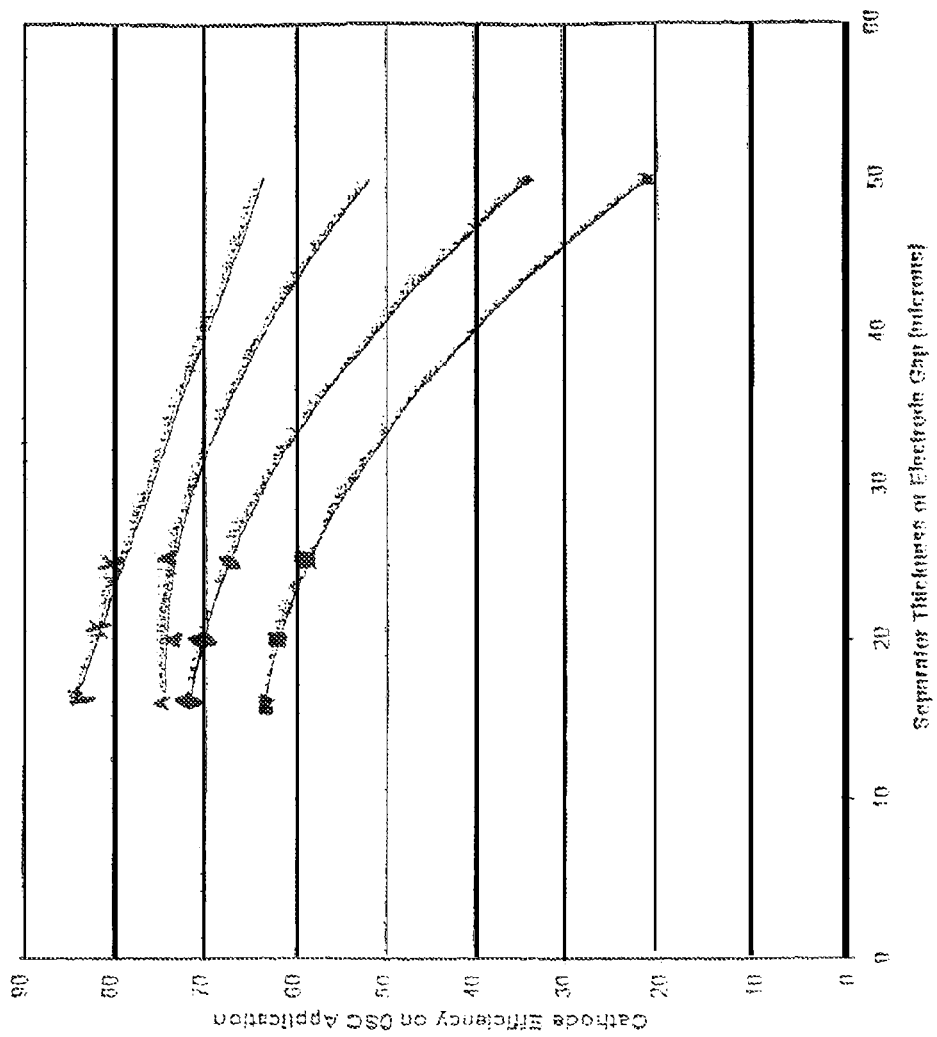
FIG. 4 is a plot of cathode efficiency on DSC application as a function of separator thickness for sets of FR6 type cells constructed having varying separator thickness, average particle size of FeS$_2$, and electrolyte composition.

Each cell was tested utilizing the 1500/650 mW ⅔s s×10 per hour DSC test. The effect of electrolyte-separator resistance and $FeS_2$ particle size is illustrated in FIG. 4. Plots of the cell groups illustrate that reductions in separator thickness, use of relatively small average particles size $FeS_2$ particles, as well as the type of electrolyte individually effect cathode efficiency. In FIG. 4, the lower most line represents a plot of a best fit line for experimental results for cells 1-4. Likewise, the remaining lines in ascending order represent results for cells 5-8, 9-12, and 13-16, respectively.

Example 9

Figure 6:
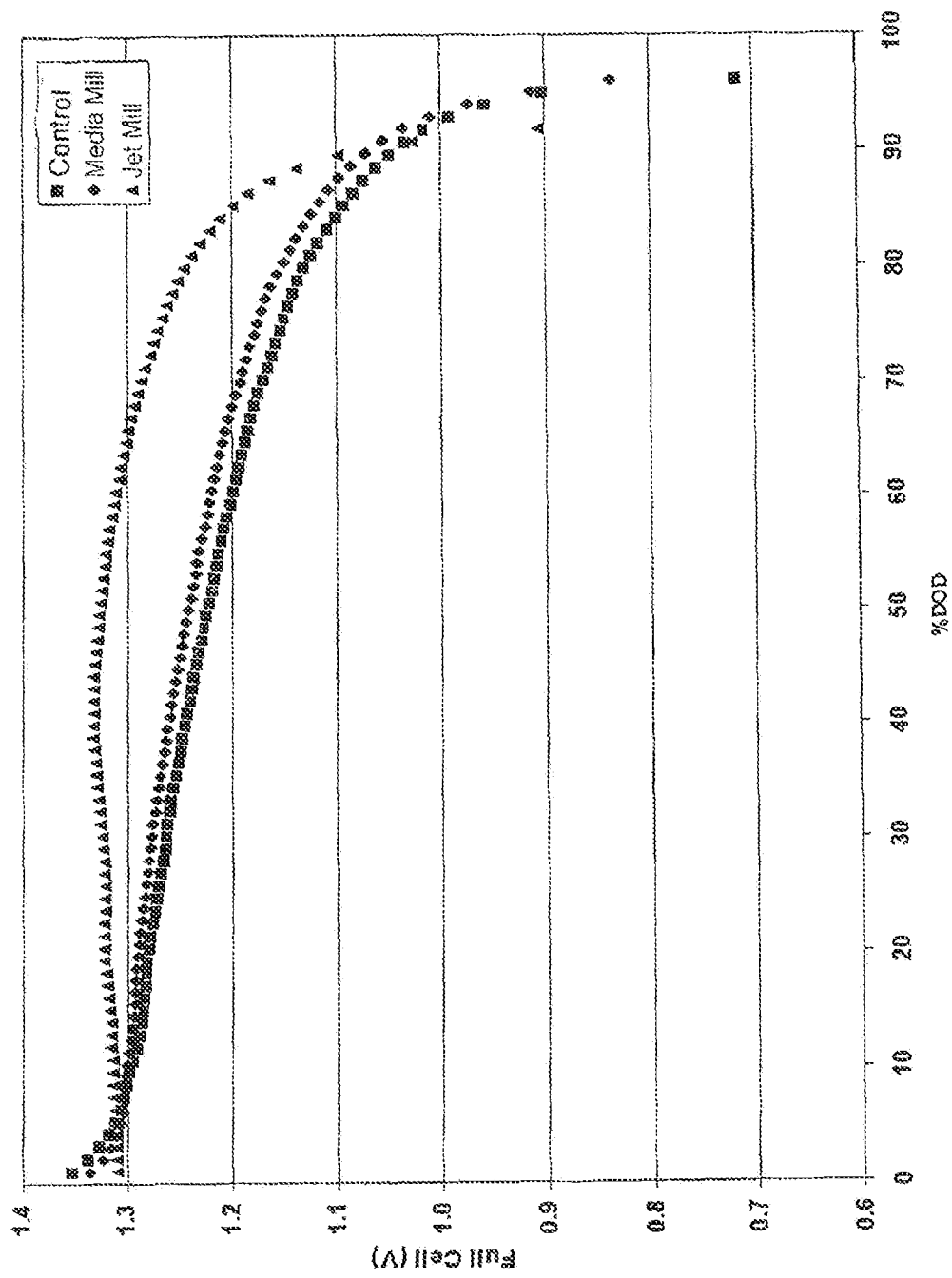
FIG. 6 is a graph of cell voltage as a function of percent depth of discharge for a prior art FeS$_2$-containing electrochemical cell, a cell containing media milled FeS$_2$ particles and a cell containing jet milled FeS$_2$ particles.

The anode voltage of FR6 type cylindrical lithium/$FeS_2$ cells having spirally wound electrode assemblies was measured over the life of the cells. The cells were of substantially identical construction as set forth in Lot D of Table 3 except that one cell was constructed of $FeS_2$ average particle of 22 μm, a second cell utilized media milled $FeS_2$ particles of average size between 5 and 10 μm (calculated estimate), and the third cell utilized jet milled $FeS_2$ particles of 4.9 μm average size and typical and expected process variation. The anode voltage of each cell was plotted as a function of depth of discharge as set forth in FIG. 5. Full cell voltage as a function of depth of discharge is plotted in FIG. 6. Testing procedures have been set forth hereinabove.

At 50% depth of discharge, the anode voltage is reduced by 40 millivolts where the average particle size is reduced from 22 to 5.2 p.m. Reducing the average $FeS_2$ particle size from 22 μm to 4.9 μm reduced the anode voltage 150 millivolts. L92 size electrochemical cells were constructed and tested in a similar manner. It was discovered that utilizing $FeS_2$ of average particle size ranges disclosed herein increase the overall cell voltage at any given depth of discharge independent of cell size.

Example 10

The $FeS_2$ average particle size, while strongly influencing high cell performance at standard ambient conditions, has an even greater influence at low temperature. The following Table 7 compares two different studies of media milled cathodes of average particle size between 5 and 10 μm (calculated estimate) and control $FeS_2$ of average particle size 22 μm, and cell performance as a function of temperature. The cells were constructed substantially the same as described for Lot D of Table 3 except for typical and expected process variation. The test is a standard simulated DSC-ANSI application previously defined (1500 mW/650 mW) to 1.05 volts. While reducing particle size improves performance by 5% or more at ambient conditions, improvements of over 600% are observed at −20° C.

TABLE 7

| Temperature | Control Min. | Media Milled Min. | Performance Ratio | Control Min. | Media Milled Min. | Performance Ratio |
|---|---|---|---|---|---|---|
| 21° C. | 304 | 325 | 1.07 | 302 | 318 | 1.05 |
| 0° C. | 178 | 227 | 1.27 | 186 | 121 | 1.14 |
| −20° C. | 14 | 102 | 7.28 | 16 | 100 | 6.25 |

It will be understood by those who practice the invention and those skilled in the art that various modifications and improvements may be made to the invention without departing from the spirit of the disclose concept. The scope of protection afforded is to be determined by the claims and by the breadth of interpretation allowed by law.

What is claimed is:

1. A process for preparing a cathode, comprising the steps of
forming a slurry comprising a wetting agent and iron disulfide particles having a mean diameter of a volume distribution of the iron disulfide particles that is greater than 20 μm,
milling the slurry utilizing a media mill comprising grinding media to reduce the mean diameter of the volume distribution of the iron disulfide particles to between 1 to 19 um,
applying the milled cathode slurry to a cathode substrate to form a cathode, and
drying the cathode.

2. The process according to claim 1, wherein the wetting agent is present in an amount from 0.1 cc to 5.0 cc per gram of solid components of the slurry.

3. The process according to claim 2, wherein the milled iron disulfide particles have a mean diameter of the volume distribution between 2 to 15 μm.

4. The process according to claim 1, wherein the milled iron disulfide particles have a mean diameter of the volume distribution between 2 to 15 μm.

5. The process according to claim 1, wherein the iron disulfide particles are naturally occurring pyrite particles.

6. The process according to claim 5, wherein the wetting agent is trichloroethylene, N-methyl-2-pyrrolidone, butyl glycol acetate, mineral spirits, or water, or a combination thereof.

7. The process according to claim 1, wherein the wetting agent is trichloroethylene, N-methyl-2-pyrrolidone, butyl glycol acetate, mineral spirits, or water, or a combination thereof.

8. The process according to claim 1, wherein a binder and one or more conductive materials are introduced to the slurry.

9. The process according to claim 8, wherein the disulfide particles introduced to the slurry are naturally occurring pyrite particles and wherein the milled cathode slurry is roll coated onto at least portions of both sides of an aluminum foil.

10. The process according to claim 9, wherein the coated aluminum foil is compacted to a thickness between 10 and 100 microns on each side of the foil.

11. An electrical chemical cell comprising:
a cathode made by the process of claim 9;
an anode consisting essentially of lithium or a lithium alloy;
a microporous polymeric separator having a thickness of 1 to 25 microns;
an electrolyte having a conductivity of at least 2.5 mS/cm; and
wherein the cathode, anode and separator are spirally wound into an electrode assembly which is disposed and sealed within a cylindrical container.

12. An electrical chemical cell comprising:
a cathode made by the process of claim 1;
an anode consisting essentially of lithium or a lithium alloy;
a microporous polymeric separator having a thickness of 1 to 25 microns;
an electrolyte having a conductivity of at least 2.5 mS/cm; and
wherein the cathode, anode and separator are spirally wound into an electrode assembly which is disposed and sealed within a cylindrical container.

13. The process according to claim 8, wherein the wetting agent is capable of substantially dissolving the binder.

14. The process according to claim 1, wherein the media mill utilizes grinding media having a mean diameter between 0.2 mm and 30 mm.

15. The process according to claim 1, wherein the media mill utilizes at least one grinding media selected from the group consisting of: soda lime, zirconia-silica, alumina oxide, yittria stabilized zirconia silica, chrome steel, zirconium silicate, cerium stabilized zirconia, yittria stabilized zirconia, and tungsten carbide.

16. An electrical chemical cell comprising:
a cathode made by the process of claim 8;
an anode consisting essentially of lithium or a lithium alloy;
a microporous polymeric separator having a thickness of 1 to 25 microns;
an electrolyte having a conductivity of at least 2.5 mS/cm; and
wherein the cathode, anode and separator are spirally wound into an electrode assembly which is disposed and sealed within a cylindrical container.

17. An electrical chemical cell comprising:
a cathode made by the process of claim 5;
an anode consisting essentially of lithium or a lithium alloy;
a microporous polymeric separator having a thickness of 1 to 25 microns;
an electrolyte having a conductivity of at least 2.5 mS/cm; and
wherein the cathode, anode and separator are spirally wound into an electrode assembly which is disposed and sealed within a cylindrical container.

* * * * *